United States Patent
Tupper et al.

(10) Patent No.: US 10,923,912 B2
(45) Date of Patent: Feb. 16, 2021

(54) ELECTRONIC TRADING CONFIRMATION SYSTEM

(71) Applicant: Intercontinental Exchange Holdings, Inc., Atlanta, GA (US)

(72) Inventors: Bruce Tupper, Atlanta, GA (US); Charles Vice, Marietta, GA (US); DongChun Xia, Duluth, GA (US); Henry D. Tullis, III, Norcross, GA (US); Sanjay Rane, Marietta, GA (US); Cynthia L. Worley, Atlanta, GA (US); Tracy Hughes, Norcross, GA (US); Edwin Marcial, Smyrna, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 268 days.

(21) Appl. No.: 15/909,215

(22) Filed: Mar. 1, 2018

(65) Prior Publication Data
US 2018/0241207 A1 Aug. 23, 2018

Related U.S. Application Data

(63) Continuation of application No. 11/932,747, filed on Oct. 31, 2007, now Pat. No. 9,935,460, which is a (Continued)

(51) Int. Cl.
*G06Q 40/06* (2012.01)
*H02J 3/00* (2006.01)
*G06Q 40/04* (2012.01)

(52) U.S. Cl.
CPC .............. *H02J 3/008* (2013.01); *G06Q 40/04* (2013.01); *Y04S 10/50* (2013.01); *Y04S 50/10* (2013.01)

(58) Field of Classification Search
CPC ......... G06Q 40/00; G06Q 40/04; H02J 3/008; Y04S 10/50; Y04S 50/10
See application file for complete search history.

(56) References Cited

U.S. PATENT DOCUMENTS

| | | | |
|---|---|---|---|
| 3,573,747 | A | 4/1971 | Adams et al. |
| 3,652,795 | A | 3/1972 | Wolf et al. |
| 3,753,233 | A | 8/1973 | Cardell, Jr. et al. |
| 3,976,840 | A | 8/1976 | Cleveland et al. |
| 4,264,782 | A | 4/1981 | Konheim |

(Continued)

FOREIGN PATENT DOCUMENTS

| | | |
|---|---|---|
| WO | 9927477 | 6/1999 |
| WO | 00/55775 | 9/2000 |
| WO | 200161602 | 8/2001 |

OTHER PUBLICATIONS

Michael B. Spring, Electronic Payment Systems, Sep. 28, 2001, University of Pittsburgh, web, 2-14 (Year: 2001).*

(Continued)

*Primary Examiner* — I Jung Liu
(74) *Attorney, Agent, or Firm* — DLA Piper LLP (US)

(57) ABSTRACT

A system and method of confirming trades of financial instruments such as OTC derivatives is disclosed. The system includes a data interface which accepts data relating to a trade from both the trader and counter party. The data includes different data fields of differing importance. The system includes a matching engine which compares the submitted data and assigns the trade a status depending on which of the data fields match. The system allows a user to filter trades on their status and display the details relating to that trade. The system also allows a user to display the data fields and change the data fields in order to change the status of the trades. The system thus allows a user to electronically confirm a trade and also identify unmatched trades and the information necessary to reconcile such unmatched trades.

18 Claims, 27 Drawing Sheets

Related U.S. Application Data continuation of application No. 10/245,848, filed on Sep. 17, 2002, now Pat. No. 8,005,743.

(60) Provisional application No. 60/338,803, filed on Nov. 13, 2001, provisional application No. 60/343,437, filed on Dec. 21, 2001.

(56) References Cited

U.S. PATENT DOCUMENTS

| | | | |
|---|---|---|---|
| 4,275,456 | A | 6/1981 | Tanaka et al. |
| 4,412,287 | A | 10/1983 | Braddock, III |
| 4,903,201 | A | 2/1990 | Wagner |
| 4,980,826 | A | 12/1990 | Wagner |
| 5,077,665 | A | 12/1991 | Silverman et al. |
| 5,168,446 | A | 12/1992 | Wiseman |
| 5,297,032 | A | 3/1994 | Trojan et al. |
| 5,517,406 | A | 5/1996 | Harris et al. |
| 5,727,165 | A | 3/1998 | Ordish et al. |
| 5,787,402 | A | 7/1998 | Potter et al. |
| 5,873,071 | A | 2/1999 | Ferstenberg et al. |
| 5,918,218 | A | 6/1999 | Harris et al. |
| 5,924,082 | A | 7/1999 | Silverman et al. |
| 6,029,146 | A | 2/2000 | Hawkins et al. |
| 6,049,785 | A | 4/2000 | Gifford |
| 6,131,087 | A | 10/2000 | Luke et al. |
| 6,161,099 | A | 12/2000 | Harrington et al. |
| 6,233,566 | B1 | 5/2001 | Levine et al. |
| 6,236,972 | B1 | 5/2001 | Shkedy |
| 6,247,000 | B1 * | 6/2001 | Hawkins ............... G06Q 40/04 705/37 |
| 6,278,982 | B1 | 8/2001 | Korhammer et al. |
| 6,285,989 | B1 | 9/2001 | Shoham |
| 6,304,858 | B1 | 10/2001 | Mosler et al. |
| 6,317,727 | B1 | 11/2001 | May |
| 6,505,174 | B1 | 1/2003 | Keiser et al. |
| 6,847,938 | B1 | 1/2005 | Moore |
| 6,850,907 | B2 | 2/2005 | Lutnick et al. |
| 7,006,991 | B2 | 2/2006 | Keiser et al. |
| 7,020,630 | B2 | 3/2006 | Russell et al. |
| 7,045,492 | B2 | 5/2006 | Jenevein et al. |
| 7,124,101 | B1 | 10/2006 | Mikurak |
| 7,134,075 | B2 | 11/2006 | Hind et al. |
| 7,136,834 | B1 | 11/2006 | Merrin et al. |
| 7,143,060 | B2 | 11/2006 | Foster et al. |
| 7,146,335 | B2 | 12/2006 | Rose |
| 7,181,425 | B1 | 2/2007 | Cha |
| 7,184,984 | B2 | 2/2007 | Glodjo et al. |
| 7,194,481 | B1 | 3/2007 | Van Roon |
| 7,212,997 | B1 | 5/2007 | Pine et al. |
| 7,668,773 | B1 | 2/2010 | Pruitt |
| 7,765,133 | B1 | 7/2010 | Edelstein et al. |
| 2001/0034731 | A1 | 10/2001 | Simmons |
| 2001/0042041 | A1 | 11/2001 | Moshal et al. |
| 2002/0007335 | A1 | 6/2002 | Millard et al. |
| 2002/0091617 | A1 | 7/2002 | Keith |
| 2002/0091624 | A1 * | 7/2002 | Glodjo ................... G06Q 40/06 705/37 |
| 2002/0120549 | A1 | 8/2002 | Yang |
| 2002/0120555 | A1 | 8/2002 | Lerner |
| 2002/0128955 | A1 | 9/2002 | Brady et al. |
| 2002/0156717 | A1 | 10/2002 | Delta et al. |
| 2002/0169707 | A1 | 11/2002 | Kock et al. |
| 2002/0194115 | A1 | 12/2002 | Nordlicht et al. |
| 2002/0198817 | A1 | 12/2002 | Dhir |
| 2003/0004853 | A1 * | 1/2003 | Ram ....................... G06Q 40/04 705/37 |
| 2003/0033240 | A1 | 2/2003 | Balso et al. |
| 2003/0083973 | A1 | 5/2003 | Horsfall |
| 2007/0061231 | A1 | 3/2007 | Kim-E |

OTHER PUBLICATIONS

"Reference Data the Key to Quality STP and T+1," TowerGroup, Oct. 15, 2001, pp. 26-34 (1-34 pages), http://www.finnovative.net/data/Reference%20Data%20The%20Key%20to%20Quality%20STP%20and%20T+1%20%20Oct%202001.pdf.

Satu P. Parikh and Gerald L. Lohse, "Electronic Futures Markets Versus Floor Trading: Implications for Interface Design," http://portal.acm.org/citation.cfm?id=1189443&coll=Portal&dl=GUIDE&CFID=21441197&CFTOKEN=21949063.

Rolfe & Nolan Homepage, Apr. 1, 2002. http://web.archive.org/web/20020401094035/http://engine.solid8.com/servlet/SolDisplay?purpose-pagedisplay&origin.

Richter, "Trading Financial Derivatives on the Web—An Approach Towards Automating Negotiations on OTC Markets," Information Systems Frontiers, 1999, vol. 1, No. 4, pp. 401-414. [Accessed Nov. 3, 2011—SpringerLink].

Frank J. Reagan, "Access System Speeds Trading of Energy Futures," Summer 1994, p. 12, 4 pages.

Philip Moore, "European Equity Markets Survey 1993," Global Investor Dc. 1993/Jan. 1994, 19 pages.

Catherine Barron, "The Shock of the New," Global Investor, Dec. 1994/Jan. 1995, 9 pages.

Ian Domowitz, "Electronic Derivatives Exchanges: Implicit Mergers, Network Externalities, and Standardisation," The Quarterly Review of Economics and Finance, vol. 35, No. 2, Summer 1995, pp. 163-175.

Domowitz et al., "Automation, Trading Costs, and the Structure of the Securities Trading Industry," Brookings-Wharton Papers on Financial Services, Jan. 1999.

Mainelli et al., "Market Survey of OTC Derivative Processing Services," Z/Yen Limited, Oct. 1999. http://www/zyen.com/PDF/OTC%20Report.pdf.

McAndrews et al., "The Emergence of Electronic Communications Networks in the US Equity Markets," Federal Reserve Bank of New York: Current Issues in Economics and Finance, Oct. 2000, vol. 6, No. 12.

Palmer-Huggins, "Exchange-Based Trading Tames Risks," Utility Business, May 2001, vol. 4, No. 5, p. 57. [Accessed Nov. 7, 2011—ProQuest] http://proquest.umi.com/pqdweb?did=73701985&sid=5&Fmt=4&clientId=31810&RQT=309&VName=PQD.

Parker, "Web Exchanges Pose Challenge in Oil Derivatives," Wall Street Jouranl, Mar. 20, 2011, p. B.II.E. [Accessed Nov. 7, 2011—ProQuest] http://proquest.umi.com/pqdweb?did=69846562&sid=5&Fmt=3&clientId=31810&RQT=309&VName=PQD.

"Gemstone Systems: IntercontinentalExchange selects GemStone's e-Business Software for World's First Internet Exchange for Globally Traded OTC Commodities; Provides World's Largest Diversified Energy/Natural Resource Companies and Financial Institutions with Versatile and Adaptable Architectural Platform," M2 Presswire, Apr. 26, 2000, p. 1. [Accessed Nov. 7, 2011—ProQuest] http://proquest.umi.com/pqdweb?did=52953241&sid=1&Fmt=3&clientId=31810&RQT=209&VName=PQD.

"Londex International: Londex Announces XML Template for OTC Derivatives Trading Market," M2 Presswire, May 15, 2000, p. 1. [Accessed Nov. 3, 2011—ProQuest] http://proquest.umi.com/pqdweb?did=53779926&sid=1&Fmt=3&clientId=31810&RQT=309&VName=PQD.

"Trinitech Systems International Inc. and Rolfe & Nolan Announce Straight through Processing Joint Venture," DataMonitor Research Store, Mar. 15, 2000. http://www.datamonitor.com/store/News/trinitech_systems_international_inc_and_rolfe_nolan_announce_straight_through_processing_joint_venture?productid=EEFA59A6-BF6F-46E3-8CB1-937671B25B14.

TruExchange: Products: Features: TrueMarket 2.0 Financial Edition, www.truexchange.com, Nov. 3, 2011. [Accessed Nov. 3, 2011—Archive.org].

"TruExchange and Rolfe & Nolan Announce Straight through Processing Partnership," Nov. 28, 2001. http://www.truexchange.com/news_events/press_releases/pr-rn1128.html.

Rolfe & Nolan Homepage, Jul. 17, 2001. http://web.archive.org/web/20010925021219/http://www.rolfeandnolan.com.

"OTC Derivatives Dealers," Securities and Exchange Commission, Nov. 3, 1998. http://www.federalregister.gov/articles/1998/11/03/98-29007/otc-derivatives-dealers.

(56) References Cited

OTHER PUBLICATIONS

"A New Regulatory Framework for Multilateral Transaction Execution Facilities, Intermediaries and Clearing Organizations; Rules Relating to Intermediaries of Commodity Interest Transactions; A New Regulatory Framework for Clearing Organizations; Exemption for Bilateral Transactions; Final Rules," Commodity Futures Trading Commission, Dec. 13, 2000.
"A New Regulatory Framework for Clearing Organizations," Commodity Futures Trading Commission, Dec. 13, 2000.
"A New Regulatory Framework for Trading Facilities, Intermediaries and Clearing Organizations; Proposed Rule," Commodity Futures Trading Commission, Mar. 9, 2001.
"Order Granting the London Clearing House's Petition for an Exemption Pursuant to Section 4(c) of the Commodity Exchange Act.," Commodity Futures Trading Commission, Oct. 1, 1999.
"OMLX, The London Securities and Derivatives Exchange Limited," Sep. 1, 1997. http://www.sec.gov/Archives/edgar/data/1043318/0000950123-97-007851.txt.
"New York Board of Trade Trade Input Processing System (TIPS) FCM User Documentation," 29 pages (UNDATED, as a result, this may not qualify as prior art).
"RANorder HTML Version 3 User Guide," Rolfe & Nolan System, Inc., 2002.
Michael B. Spring, "Electronic Payment Systems," Sep. 28, 2001, University of Pittsburgh, web, pp. 2-14 (Year: 2001).

\* cited by examiner

ICE-Confirmation- Trade Details - Microsoft Internet Explorer eConfirm — First_Name@Test Company

Trade Details

My Trade

| Field | Value |
|---|---|
| Market Type | Financial Natural Gas |
| Trade Type | NG Fixed Price Swap |
| Product ID | 300 |
| Product Name | NG Fin FF for LD1 |
| Reference Price | NYMEX-NG |
| Averaging Method | Last 1 |
| Pricing Calendar | NYMEX |
| Settlement Method | Cash |
| Payment Calendar | NY Banks |
| Payment From | After Settlement |
| Price Currency | USD |
| Price Unit | MMBtu |
| Quantity Unit | MMBtu |
| Roll Days | 0 |
| Settlement Currency | USD |
| Trade Date | Jul-13-2001 |
| Buyer | ICE_Company_1 |
| Seller | ICE_Company_2 |
| Quantity | 5000 |
| Quantity Frequency | Daily |
| Total Quantity | 1925000 |
| Start Date | Jan-01-2002 |
| End Date | Dec-31-2002 |
| Price | 3.91 |
| Pricing Frequency | Monthly |
| Settlement Frequency | Monthly |
| Payment Days | 5 |
| Payment Terms | Business |
| Contract Date | Jul-01-2001 |
| Sender Trade Ref Id | ICECo1All 1090 M902 |
| Client Version Id | |
| Broker | ICE |
| Parent Id | |
| Trader | SJ |
| Trade Status | PENDING |
| Last Status Change | Aug-23-2002 15:02:59 |

[Edit] [Cancel]

@Copyright Intercontinental Exchange, Inc. 2001. All Rights Reserved

FIG. 6B

| | My Trade | CounterParty Trade |
|---|---|---|
| Market Type | Financial Natural Gas | Financial Natural Gas |
| Trade Type | NG Fixed Price Swap | NG Fixed Price Swap |
| Product ID | 300 | 300 |
| Product Name | NG Fin FP for LD1 | NG Fin FP for LD1 |
| Reference Price | NYMEX-NG | NYMEX-NG |
| Averaging Method | Last 1 | Last 1 |
| Settlement Method | NYMEX | NYMEX |
| Pricing Calendar | Cash | Cash |
| Payment Calendar | NY Banks | NY Banks |
| Payment From | After Settlement | After Settlement |
| Price Currency | USD | USD |
| Price Unit | MMBtu | MMBtu |
| Quantity Unit | MMBtu | MMBtu |
| Roll Days | D | D |
| Settlement Currency | USD | USD |
| Trade Date | Jul-13-2001 | Jul-13-2001 |
| Buyer | ICE_Company_1 | ICE_Company_1 |
| Seller | ICE_Company_2 | ICE_Company_2 |
| Quantity | 5000 | 5000 |
| Quantity Frequency | Daily | Daily |
| Total Quantity | 1825000 | 1825000 |
| Start Date | Jan-01-2002 | Jan-01-2002 |
| End Date | Dec-31-2002 | Dec-31-2002 |
| Price | 3.81 | 3.81 |
| Pricing Frequency | Monthly | Monthly |
| Settlement Frequency | Monthly | Monthly |
| Payment Days | 5 | 5 |
| Payment Terms | Business | Business |
| Contract Date | Jul-01-2001 | Jul-01-2001 |
| Sender Trade Ref Id | ICECo1All 1000 M902 | ICECo1All 1000 M902 |
| Client Version Id | | |
| Broker | ICE | ICE |
| Parent Id | | |
| Trader | SJ | SJ |
| Trade Status | PENDING | PENDING |
| Last Status Change | Aug-23-2002 15:02:59 | Aug-23-2002 15:02:59 |

FIG. 6C

| | My Trade | Alleged 1 | Alleged 2 | Alleged 3 |
|---|---|---|---|---|
| Market Type | Financial Natural Gas | Financial Natural Gas | Financial Natural Gas | Financial Natural Gas |
| Trade Type | NG Fixed Price Swap | NG Fixed Price Swap | NG Fixed Price Swap | NG Fixed Price Swap |
| Product ID | 300 | 300 | 300 | 300 |
| Product Name | NG Fin FP for LD1 | NG Fin FP for LD1 | NG Fin FP for LD1 | NG Fin FP for LD1 |
| Reference Price | NYMEX-NG | NYMEX-NG | NYMEX-NG | NYMEX-NG |
| Averaging Method | Last 1 | Last 1 | Last 1 | Last 1 |
| Pricing Calendar | NYMEX | NYMEX | NYMEX | NYMEX |
| Settlement Method | Cash | Cash | Cash | Cash |
| Payment Calendar | NY Banks | NY Banks | NY Banks | NY Banks |
| Payment From | After Settlement | After Settlement | After Settlement | After Settlement |
| Price Currency | USD | USD | USD | USD |
| Price Unit | MMBtu | MMBtu | MMBtu | MMBtu |
| Quantity Unit | MMBtu | MMBtu | MMBtu | MMBtu |
| Roll Days | D | D | D | D |
| Settlement Currency | USD | USD | USD | USD |
| Trade Date | Jul-13-2001 | Jul-13-2001 | Jul-13-2001 | Jul-13-2001 |
| Buyer | ICE_Company_1 | ICE_Company_1 | ICE_Company_1 | ICE_Company_1 |
| Seller | ICE_Company_2 | ICE_Company_2 | ICE_Company_2 | ICE_Company_2 |
| Quantity | 5000 | 5000 | 5000 | 5000 |
| Quantity Frequency | Daily | Daily | Daily | Daily |
| Total Quantity | 1825000 | 1825000 | 1825000 | 1825000 |
| Start Date | Jan-01-2002 | Jan-01-2002 | Jan-01-2002 | Jan-01-2002 |
| End Date | Dec-31-2002 | Dec-31-2002 | Dec-31-2002 | Dec-31-2002 |
| Price | 3.7651 | 3.7651 | 3.7651 | 3.7651 |
| Pricing Frequency | | | | |
| Settlement Frequency | Monthly | Monthly | Monthly | Monthly |
| Payment Days | 5 | 5 | 5 | 5 |
| Payment Terms | Business | Business | Business | Business |
| Contract Date | Jul-29-2001 | Jul-29-2001 | Jul-29-2001 | Jul-29-2001 |
| Sender Trade Ref Id | ICEco1All_300_AM001 | ICEco2_T17 | ICEco2_T17 | ICEco2_T17 |
| Client Version Id | ICE | ICE | ICE | ICE |
| Broker | | | | |
| Parent Id | | | | |
| Trader | SJ | SJ | SJ | SJ |
| Trade Status | UNMATCHED | UNMATCHED | UNMATCHED | UNMATCHED |
| Last Status Change | Aug-22-2002 12:52:37 | Aug-22-2002 12:52:37 | Aug-22-2002 12:52:37 | Aug-22-2002 12:52:37 |

© Copyright Intercontinental Exchange, Inc. 2001. All Rights Reserved

| eConfirm | Trade Details | First_Name@Test Company |
|---|---|---|

Alleged Trade

| | |
|---|---|
| Market Type | Financial Natural Gas |
| Trade Type | NG Fixed Price Swap |
| Product ID | 3003 |
| Product Name | NG Fin FP for Swing |
| Reference Price | Cash |
| Averaging Method | NY Banks |
| Pricing Calendar | After Settlement |
| Settlement Method | 4 |
| Payment Calendar | |
| Payment From | USD |
| Price Currency | MMBtu |
| Price Unit | MMBtu |
| Quantity Unit | USD |
| Roll Days | May-06-2001 |
| Settlement Currency | ICE_Company_1 |
| Trade Date | ICE_Company_2 |
| Buyer | 5000 |
| Seller | 9000 |
| Quantity | Jan-01-2002 |
| Quantity Frequency | Dec-31-2002 |
| Total Quantity | 0.05 |
| Start Date | Daily |
| End Date | Gas Daily Daily-Appalachia, Dominion North Point |
| Price | Calendar |
| Pricing Frequency | Daily Gas |
| Settlement Frequency | Monthly |
| Payment Days | 5 |
| Payment Terms | Business |
| Contract Date | Jul-01-2001 |
| Sender Trade Ref Id | ICECo2_303_AP002 |
| Client Version Id | |
| Broker | ICE |
| Parent Id | |
| Trader | AJ |
| Trade Status | PENDING |
| Last Status Change | Aug-21-2002 16:19:30 |

[ Find ]  [ Confirm ]

@Copyright Intercontinental Exchange, Inc. 2001. All Rights Reserved

FIG. 6D

| | Admin | Data Mapping | Confirm Summary | New Confirm | Logs | Reports | File Upload | Help | Log Out |
|---|---|---|---|---|---|---|---|---|---| eConfirm — FIRST_NAME @ Test Company 1 eConfirm Logs

| File Upload Log | Message Log | Audit Log |
|---|---|---|

Data Type: Trade Date ▼    From: 04/25/02    To: 05/25/02    Search

| +/- | Message | Reference id | Date | Type | Code | | | | |
|---|---|---|---|---|---|---|---|---|---|
| + | Your value is not mapped or not in standard format | 3 | | | | | | | |
| − | The trade being updated has already been matched | 4 | | | | | | | |
| | The trade being updated has already been matched | JA150_0013 | Oct-10-2001 | 5 | 2126 | | | | |
| | The trade being updated has already been matched | JA150_0014 | Oct-10-2001 | 5 | 2126 | | | | |
| | The trade being updated has already been matched | JA150_0015 | Oct-10-2001 | 5 | 2126 | | | | |
| | The trade being updated has already been matched | JA150_0016 | Oct-10-2001 | 5 | 2126 | | | | |

FIG. 7B eConfirm

Admin  Data Mapping  Confirm Summary  New Confirm  Logs  Reports  File Upload  Help  Log Out FIRST_NAME @ [Test Company 1 ▼]

Manager's View | Breaks

Reports

Data Type: [Trade Date ▼]  From: [04/25/02] 🔍  To: [05/25/02] 🔍  [Search]

| | Matched | Unmatched | Pending | Alleged | Canceled | Total |
|---|---|---|---|---|---|---|
| Financial Natural Gas | 10 | 1 | 14 | 0 | 0 | 25 |
| Financial Oil | 5 | 0 | 11 | 2 | 2 | 20 |
| Financial Power | 0 | 0 | 26 | 9 | 9 | 43 |
| Physical Natural Gas | 3 | 2 | 7 | 1 | 1 | 14 |
| Physical Power | 7 | 0 | 9 | 8 | 8 | 32 |
| Total | 25 | 3 | 66 | 20 | 20 | 134 |

[Export]

FIG. 8A eConfirm | Admin Data Mapping Confirm Summary New Confirm Logs Reports File Upload Help Log Out Manager's View | Reports | FIRST_NAME @ Test Company 1

Data Type: Trade Date | Breaks | From: 04/25/02 To: 05/25/02 | C/P: | Search

| | Financial Oil | Financial Natural Gas | Physical Gas | Financial Power | Physical Power | Totals |
|---|---|---|---|---|---|---|
| Field 1 | 2 | 1 | 6 | 2 | 2 | 13 |
| Field 2 | 5 | 2 | 3 | 1 | 5 | 16 |
| Field 3 | 3 | 4 | 1 | 3 | 3 | 14 |
| Field 4 | 1 | 3 | 5 | 4 | 1 | 14 |
| Field 5 | 2 | 1 | 2 | 1 | 2 | 8 |
| Field 6 | 1 | 1 | 3 | 2 | 1 | 8 |
| Totals | 14 | 12 | 20 | 13 | 14 | 73 |

Export

FIG. 11A eConfirm — Admin  Data Mapping  Confirm  Summary  New Confirm  Logs  Reports  File Upload  Help  Log Out

New Confirm            FIRST_NAME @ J.Aron&Company

Market Type: Financial Natural Gas ▾   Product: NG Fin FP for LD1 ▾   C/P: Sempra ▾   My Action: Buy ▾

Fields / My Values

| Field | Value |
|---|---|
| Product ID | 300 |
| Reference Price | NYMEX-NG |
| Averaging Method | Last 1 |
| Pricing Calendar | NYMEX |
| Settlement Method | Cash |
| Payment Calendar | NY Banks |
| Payment Form | After Settlement |
| Price Precision | 4 |
| Price Currency | USD |
| Price Unit | MMBtu |
| Quality Unit | MMBtu |
| Roll Days | 0 |
| Settlement Currency | USD |
| Trade Date | Jan-17-2002 |

| | | |
|---|---|---|
| ☐ | Buyer | J.Aron&Company |
| ☐ | Seller | Sempra Energy Group |
| ☐ | Quantity | 15000 |
| ☐ | Quantity Frequency | Daily |
| ☐ | Total Quantity | 420000 |
| ☐ | Start Date | Feb-01-2002 |
| ☐ | End Date | Feb-28-2002 |
| ☐ | Price | 2.27 |
| ☐ | Pricing Frequency | Monthly |
| ☐ | Settlement Frequency | Monthly |
| ☐ | Payment Days | 5 |
| ☐ | Payment Terms | Business |
| ☐ | Contract Date | Jan-17-2002 |
| ☐ | Sender Trade Ref Id | SWPDN2M |
| ☐ | Broker | ICX |
| ☐ | ParentId | |
| ☐ | Trader | BACHMP |
| ☐ | Trade Status | New |
| ☐ | Last Status Change | Jan-18-2002 16:13:35 |

ELECTRONIC TRADING CONFIRMATION SYSTEM

RELATED APPLICATIONS

This application is a continuation of U.S. patent application Ser. No. 10/245,848 filed Sep. 17, 2002, which claims priority from U.S. Provisional Application No. 60/338,803 filed Nov. 13, 2001 and U.S. Provisional Application No. 60/343,437 filed Dec. 21, 2001, the contents of which are hereby incorporated by reference.

FIELD OF INVENTION

This invention relates to a system and method of clearing trades on an electronic exchange and more specifically to a system and method which matches known information offered by a trader and a counter party to confirm a trade.

BACKGROUND OF INVENTION

Traditional trading of commodities or financial instruments such as stocks and bonds has taken place in markets where traders offer various commodities at different prices. Such trades were performed using hand signals and paper was used to finalize the actual trading contract. With the advent of computers, more complex and faster trades may be made by integrating computing power. Additionally, the growth of the Internet and other electronic communications systems has moved the realm of trading beyond the trading floor. With the increasing complexity of the economy, a greater diversity of financial commodity products may be offered including derivatives. Derivatives are defined as a financial contract whose value depends on the values of one or more underlying assets or indices of asset values, Presently, derivatives are traded in traditional exchanges which can include futures or options in commodities ranging from pork bellies to currency prices. Recently, derivatives have also been traded in the over-the-counter (OTC) market defined by transactions by large financial institutions such as commercial banks or insurance companies. Such derivatives can include swaps, options, caps, floors, corridors, etc. derived from interest rates, foreign currencies, equities and other commodities or financial instruments.

Exchange derivatives are structured with standard terms such as contract size, maturity, expiration date, etc. set by an exchange such as the Chicago Board of Trade. Additionally, trades of exchange derivatives and their supporting data are sent to a third party clearing house for settlement. In contrast, OTC derivatives are more flexible because none of the business terms of an OTC derivative are standardized. In addition, the settlement of the trade occurs directly through the trading parties as no third party clearing house exists because of the diversity of different derivatives.

One emerging over-the-counter market of derivative products is in the field of energy. With deregulation of the power industry, there is a much greater diversity of power generators with different types of energy sources such as natural gas, oil, electricity and solar. With such diverse energy sources and suppliers, a market has arisen in trading the commodities of energy between such producers. Various financial and physical derivative instruments such as swaps, options or spreads have been formulated by various players in the energy market. Players in this market range from traditional trading firms to energy companies. Like many financial markets, technology makes accessibility to the over-the-counter energy derivative market far greater.

Traders in the OTC energy market typically agree to prices and terms with another trading counter party for a particular type of derivative in an energy product such as a natural gas swap. This type of trade involves certain common terms such as settlement and payment terms. The trade may be made directly with a counter party, or by phone, or more recently, via an electronic platform such as the Internet. Such trades are recorded by the traders on their trade notebooks and trade data is entered directly into their company's trade data capture computer systems. These systems generate confirmation documents and summary data relating to the trade.

Like other OTC derivatives, energy derivatives do not have a uniform confirmation system of terms once a trade is made between the parties. Thus, when a trade is made, the parties must confirm the terms of the trade. Both the traders record the details of the trade in a trade notebook and enter the data directly into their company's trade capture system. The company's trade capture system prints confirmation documents which are reviewed and sent to the other party. This typically takes place by faxing the confirmation documents to the other party. A clerk then checks the terms of the received confirmation documents against the recorded alleged trade in the trade notebook and the data output of the receiving party's own trade capture system. Information such as the buyer and seller, purchase or sale, product, instrument, delivery point, price, delivery terms, etc. must match. After a clerk reviews the trade, any discrepancies must be reported to the trading counter party and a reconciliation must be made based on the recorded information. When it is confirmed that the information is accurate, the contracts are then signed and exchanged. Thus, the amount of time necessary for confirming the trade takes much longer then the trade itself. Even a trade which is correctly executed by both parties can take days to be fully confirmed. Errors prolong the process.

However, other errors are possible since clerks must examine and confirm numerous trades with often different forms for each derivative product. The confirmation problems result in much greater costs and decreased efficiencies. In fact, 18% of derivatives trades contain errors at the time of entry into a trade capture system. Many OTC derivatives are governed by a model Master Agreement endorsed by the International Swaps and Derivatives Association ("ISDA"). While the master agreement does make certain reconciliation more efficient, it must be modified for each specific OTC derivative product and the terms must still be manually examined in order to settle the trades.

Thus, there is a need for an automated confirmation system for OTC derivative products. There is yet another need for a system which can standardize confirmation of OTC derivatives. There is a need for a confirmation system which allows the rapid entry and processing of trade data. There is also a need for a system which allows a user to summarize trades for a certain period to determine which trades have irregularities. There is a further need for a trading confirmation system which will match data relating to fields and categorize the trades to determine which trades are confirmed.

SUMMARY OF THE INVENTION

These needs and others may be met by the present invention, which has an aspect that is a system of determining the status of trades between a trader and a counter party, based on an electronic submission of a data file representing details in data fields of a trade by the trader and a second data file representing details in data fields of the trade by the counter party. The system has a data interface engine which reads the data files and data fields. A matching engine is coupled to the data interface engine and matches selected data fields in the data files and assigns a status to the trade based on whether the data fields submitted matches. A database is coupled to the matching engine which stores the resulting trade data to confirm the trade if all of the key details in the two data files match.

Another aspect is a method of electronically confirming trading of financial products, which include data fields that are agreed upon between a trader and a counter party. Trader data is submitted, including different data fields relating to the trade via an electronic interface. Counter party data is submitted including different data fields relating to the trade via an electronic interface. The data fields submitted by the trader and the counter party are compared to determine which fields match. The trade is confirmed if certain data fields match.

Another aspect is a method of electronically confirming trades of financial products between a party and a counter party having a master agreement governing the trades of the financial products. The master agreement is amended to allow electronic confirmation. The trader and the counter party are both connected electronically to a matching engine. Trader data, including different data fields relating to a trade, is submitted to the matching engine. Counter party data, including different data fields relating to the trade, is submitted to the matching engine. The trade is confirmed by matching certain data fields.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein:

FIG. 5 is a confirmation summary screen which is a user interface to the confirmation system of FIG. 1;

FIG. 6A is a trade details screen accessed for pending trades which is a user interface to the confirmation system of FIG. 1;

FIG. 6B is a trade details screen accessed for matched or canceled trades which is a user interface to the confirmation system of FIG. 1;

FIG. 6C is a trade details screen accessed for unmatched trades which is a user interface to the confirmation system of FIG. 1;

FIG. 6D is a trade details screen accessed for alleged trades which is a user interface to the confirmation system of FIG. 1;

FIG. 7B is a message log screen which is a user interface to the confirmation system of FIG. 1;

FIG. 8A is a reports screen of trade status which is a user interface to the confirmation system of FIG. 1;

FIG. 8B is a reports screen of specific broken fields for trades which is a user interface to the confirmation system of FIG. 1;

FIG. 9 is a data mapping screen which is a user interface to the confirmation system of FIG. 1;

FIG. 10 is a data mapping details screen which is a user interface to the confirmation system of FIG. 1;

FIGS. 11A and 11B are portions of a new confirmation screen which is a user interface to the confirmation system of FIG. 1;

FIG. 13B is an administration screen for defining default values which is a user interface to the confirmation system of FIG. 1.

DESCRIPTION OF THE PREFERRED EMBODIMENT

Figure 1:
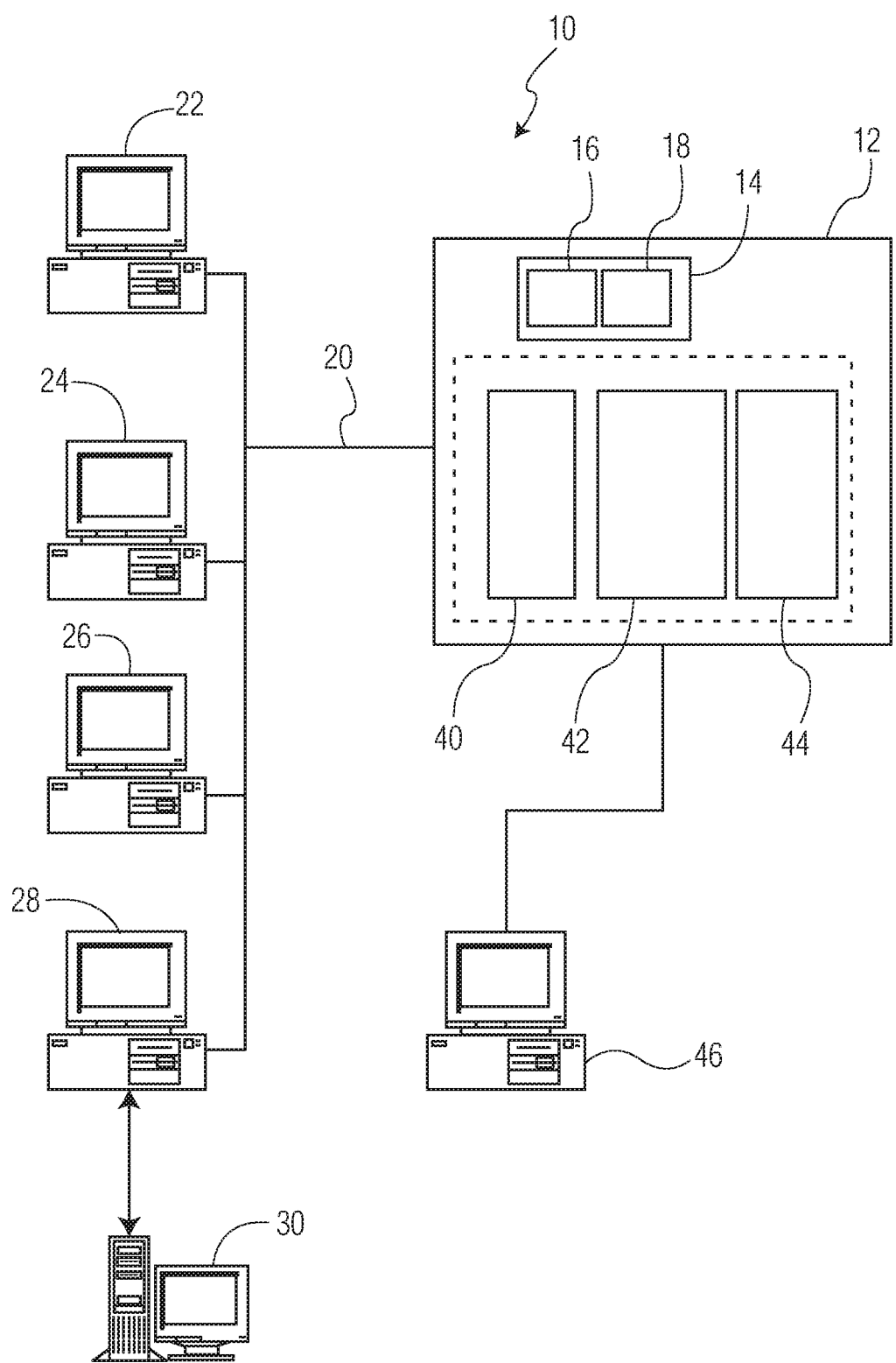
FIG. 1 is a block diagram of a confirmation system for electronic trades of financial products according to one example of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows a block diagram of a confirmation system 10 which is an exemplary embodiment of the present invention. The confirmation system 10 has a processing system 12 which typically resides at a third party service provider. The processing system 12 is typically provided by a third party vendor independent from the trader and the counter party. An example of such a third party is Intercontinental Exchange which offers confirmation services for energy related derivative products. The processing system 12 may also reside with a trader or a counter party. Both the trader and the counter party agree in advance as part of a Master Agreement that the processing system 12 serves as confirmation of trades between them.

The processing system 12 has a matching engine 14 having a central processor 16. A confirmation program 18 is stored on the matching engine 14 and is run by the central processor 16. The processing system 12 has an external data input 20 which is connected to trading computers such as computers 22, 24, 26 and 28. The processing system 12 may be part of an intranet including the trading computers 22, 24 and 26 and thus may reside with the same trading firm.

Alternatively, the trading computers 22, 24, 26 and 28 may be computers coupled to the processing system 12 via the Internet in the case of day traders or other trading firms who use the processing system 12 to confirm their trades. As will be explained, each of the computers 22, 24, 26 and 28 have different software for the submission of trade data to the processing system 12. Of course, it is to be understood that computers 22-28 are merely shown as examples and there can be numerous computers which submit trade data to the processing system 12.

Over the counter trades involving derivatives such as a crude oil swap in the financial oil market are made between a trader and another trader termed a counter party. Such a trade involves two trading entities entering a contract for crude oil that is to be settled against an agreed upon price index such as Platt's. The trade between the trader and the counter party may be made via telephone or over a secure Internet connection via a trading program such as the trading platform offered by Intercontinental Exchange. Of course, other ways to conduct trades may be used. Once the trade is agreed upon between the trader and the counter party, the details of the trade such as the type of energy product, price, date, etc. are logged by the trader and the counter party. In a trading firm, back office systems may be run on a back office computer 30 which also interfaces with other internal systems such as accounting in order to track the trade. The back office computer 30 may be connected to trading computers such as trading computer 28. In order to confirm that the trade is a legitimate trade, the details of the trade understood by both the trader and the counter party must be the same. Once the details are matched together, the trade is settled and considered executed.

The data for the trade as understood by both the trader and the counter party is entered separately via the trading computers 22, 24, 26 and 28, which each represent a different means of communication of data to the processing system 12. The data from the trading computers are sent to a data interface module 40 of the processing system 12 via a secure interface using SSL and 128 bit encryption. Of course, other alternative or additional security measures may be employed. The matching program 18 on the processing system 12 classifies the trade in one of five different categories based on the consistency of the data with that submitted by the counter party using a data processing module 42 coupled to the interface module 40. The data from the trades are stored in a database module 44 which is coupled to the data processing module 42.

The data fields relating to a trade of a specific type of product may be codified, for example, by International Swaps and Derivatives Association ("ISDA"). Typically the data in a trade includes price, trade date, counter party, settlement terms, payment instructions and delivery terms. Some of the data fields are specific to the product type and market. For example, for crude oil swaps in the financial market, specific terms may include a provision for common pricing. The product identification is a number assigned by the processing system 12 assigned to the product type. Certain data fields are classified as key which represent data that are used for first level matching of the trade. The key fields include price, quantity, total quantity, counter party, trade date and product identification for all products. Certain data fields are classified as required which is a field for which a user must submit a data value. For example a required field is the price in a crude oil swap. The required data fields are used for second level matching of the trade. Certain data fields are classified as information only which represents data that is supplied for informational purposes only, such as the broker for a crude oil swap. The program 18 also allows a system administrator to manage the authorized users to access the data and view summaries of the trades. A user may view trades, submit data regarding trades, edit, cancel, confirm and dispute trades through the program 18 via the computers 22, 24, 26 and 28 in FIG. 1.

The program 18 allows a user to submit data relating to a trade through one of the computers 22, 24, 26 and 28 and that trade will be categorized and allow a user to add additional information or edit inconsistent information to finalize any trades which do not have the initial agreement of the parties. The five categories of submitted trades are matched, alleged, unmatched, pending and canceled. A matched trade is the desired end result of a submitted trade which indicates that all data fields are matched exactly and all counter parties agree with the trader. An unmatched trade is one in which the key data fields match, but secondary fields such as required and information fields do not match between the trader and the counter party. A pending trade is a trade where one or more of the key data fields does not match between the trader and the counter party. A cancelled trade are those trades initially submitted, but then withdrawn by the trader. An alleged trade is a trade that a counter party alleges to have made with the trader, but the trader does not have an exact match of the data fields for the trade.

Thus, the program 18 allows a user to quickly review matched trades and identify trades which have problems such as unmatched terms or disagreement by the counter party. By identifying such disputed trades with an indicator in the matched category, the counter party and user may reconcile the conflict and correct the data using the program 18. Greater efficiency in the reconciliation process is gained by both identifying problematic trades and also identifying the specific terms which are in conflict.

In this example, the processing system 12 may interface with a user via a user computer 46 which may be a personal computer with an Internet browser program with the capability of running HTML and JavaScript. The user is thus presented with a web interface displayed on the user computer 46 to perform the functions of the program 18. With proper authorization, the user computer 46 allows a user to control the above functions, as well as generate reports of data relating to trades confirmed by the program 18. Of course, it is to be understood that any of the other trading computers 22, 24, 26 and 28 may also be capable of running the user interface via a web browser program.

Figure 2:
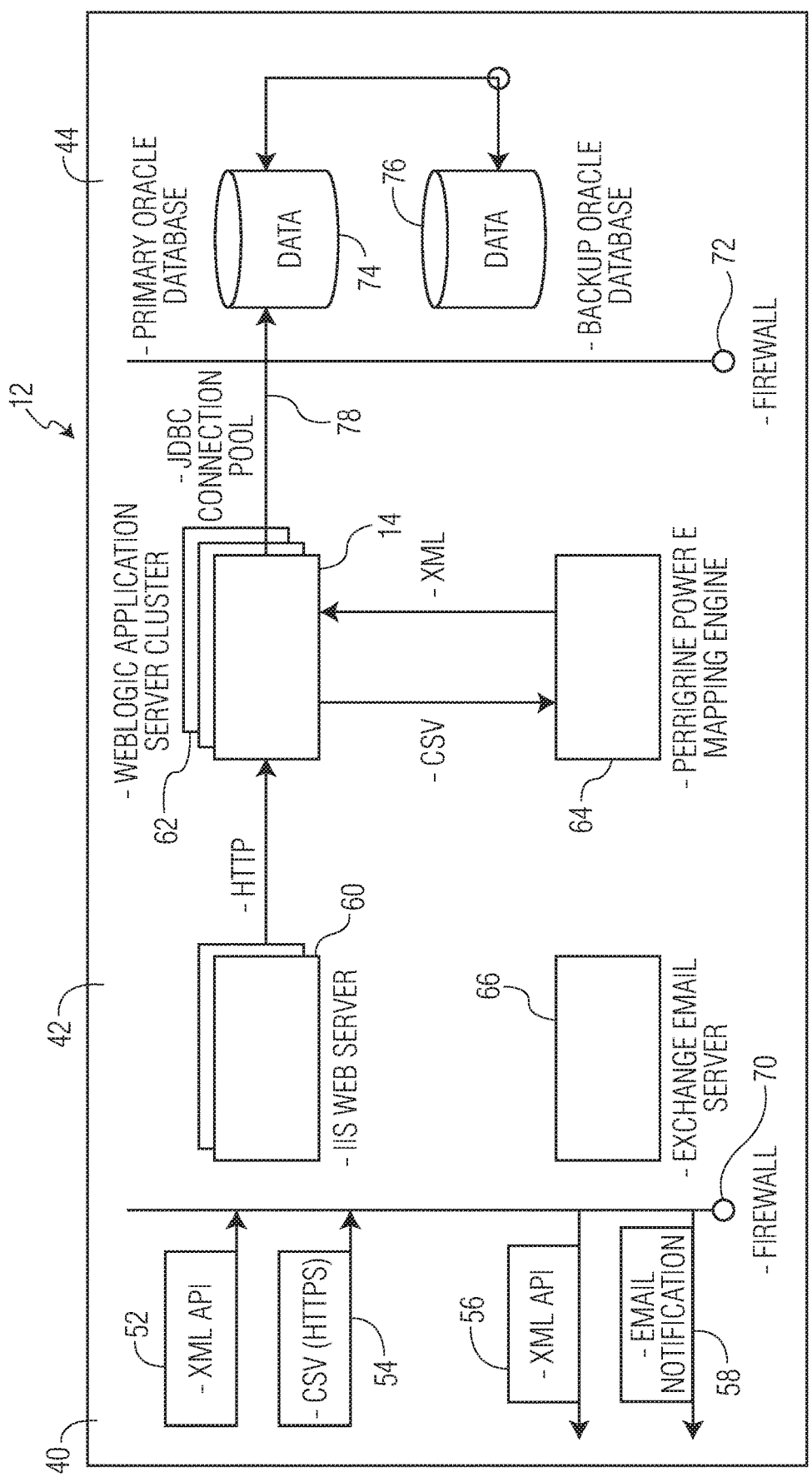
FIG. 2 is a block diagram of the back office system which is part of the system of FIG. 1 and includes a matching engine which matches submitted trade details to confirm the trades.

FIG. 2 is a block diagram of the components of the processing system 12. The data interface module 40 has two data interfaces 52 and 54, which are an XML interface 52 and a tab delimited file interface 54 via the HTTPS protocol. Of course, other types of data interface protocols such as SOAP may be used to input data into the processing system 12. Other delimiters, such as commas, may also be used to separate data fields in flat file.

Data from users may be entered through four different input mechanisms: a webpage on an Internet connected computer such as trader computer 22; a dedicated webpage with tab delimited file upload capability such as trader computer 24; an automated tab delimited file via a HTTPS capable computer such as trader computer 26; and an XML application programming interface (API) on a connected computer such as trader computer 28. The data interface module 40 also has an XML API module 56 and an e-mail notification interface 58. The XML API module 56 and e-mail notification interface 58 provides output mechanisms based on requests from a user. The XML API interface provides an XML response mechanism for requests received via the XML API interface 52. The e-mail notification interface 58 provides responses to requests based on specific events within the system. These responses notify the user of events within the system 12 that affect specific data objects associated with the addressee of the e-mail notification.

The Internet connected computer 22 may be connected directly to the interface module 40, The user logs in and a webpage is displayed with a data entry form. The user fills out the data on the webpage and transmits the data. The data is then received on the XML interface 52. This method allows users to submit the data fields of one trade at a time.

The second computer 24 allows access to a webpage which has the necessary XML script to allow uploading of a single tab delimited file. The tab delimited file may be in the user's proprietary data format and can contain records of data fields reflecting many trades. Thus, a separate tab delimited file may be written for all trades for the day, or all trades of a particular market or product. The data contents in tab delimited file are then read by the processing system 12 via the tab delimited interface 54, as will be described below.

The third computer 26 contains a file upload agent which includes an HTTPS compatible posting agent such as an Open Source tool, cURL. As explained above, the tab delimited file may contain data fields relating to any number of trades. The cURL program is used to periodically check a given directory on the computer 26, read any updated tab delimited files in the directory, and securely post it to the processing system 12 using SSL. This is a 128 bit encryption in this example, but other security protocols may be used. The sent tab delimited files are input into the file upload interface 54.

The fourth computer 28 has an XML API which accepts trade data and fields in the standard format which will be described below. This standard format allows the data to be input into the XML interface 52. The use of an XML API is preferred because it allows the user and the counter party to submit trade information in real time as the trades are entering into their back office systems, such as on computer 30. In this example, the XML API on the computer 28 is based on XML format messaging to allow users to use the platform and development language of their choice.

The API on the computer 28 may use XML over the HTTP or HTTPS to enable transmission of data over the Internet to the processing system 12. The data scheme becomes a binding contract between the user and the counter party if both parties match all required fields of the trade, as will be detailed below. In order to use the HTTPS protocol, the user registers a digital certificate with the owner of the processing system 12 and handles cookies sent from the processing system 12.

Alternatively, the API may use XML messaging over HTTPS to enable transmission of data over the Internet to the processing system 12. The XML format message uses stored libraries to facilitate protocol handling and to interface with XML. The body of the XML message contains mandatory information intended for the ultimate recipient of the message.

The data processing module 42 includes an Internet web server cluster 60, a weblogic application server cluster 62, a trade mapping engine 64, and an e-mail server 66. The application server cluster 62 may include a server to store the trade matching engine 14 that is based on Oracle 8i, but other kinds of software and hardware which have database functionality may be used. The processing module 42 is protected by a firewall 70 which is interposed between the Internet web server cluster 60 and the interface module 40. The firewall 70 protects the Internet web server cluster 60 from unauthorized data from unidentified computers. The firewall 70 in this example is a Checkpoint firewall, but other types of firewalls may be used.

A second firewall 72, which is preferably a Checkpoint firewall, connects the Internet Web Cluster 60 with the processing module 42 and the database module 44 to protect data stored in them. The database module 44 includes a primary database server 74 and a backup database server 76 that access the database using shared storage. The database servers 74 and 76 supporting the database include the data described below which relate to trade information and confirmation data. This data includes internal identification and submission company identification for each company and trader using the system 10. The primary and backup database servers 74 and 76 support the Oracle databases in the preferred embodiment with a Sun Cluster to manage the cluster of database server 76 with the primary database server 74 and the shared storage.

In this example, the Internet web server cluster 60 includes Microsoft Internet Information servers which act as a gateway into the core components of the processing module 42. The Internet web server cluster 60 is used to store and send HTML pages which are used to build the graphical user interfaces for the confirmation program 18. The weblogic server cluster 62 is responsible for hosting the XML web services from the XML interfaces 52 and 54. The cluster 62 also receives uploaded tab delimited files, parses XML and converts the inputs to Java objects. The server cluster 62 also interfaces with the database module 42 via an interface 78. The interface 78 in this example is a JDBC connection pool, but it is to be understood that other connections may be used.

As will be explained below, the program has a standard format for the needed data field for a trade of a particular set of markets and products. This standard may be, for example, set by Intercontinental Exchange through the XML interface 52. This standard format is the native language of the confirmation system 10. Users may use different field and data formats through the tab delimited file input interface 54. If data is input in a different field and data format than the system standard, the mapping engine 64 converts the submitted data to the standard format.

Figure 3:
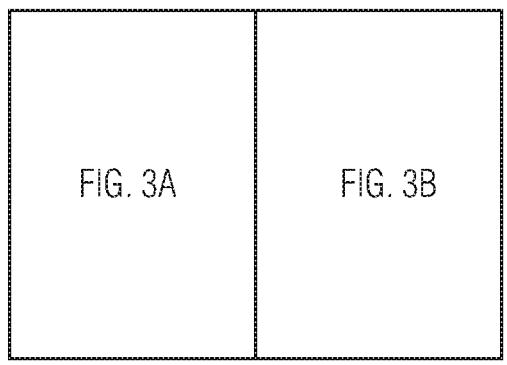
FIG. 3 is a diagram of the database tables which represent trades submitted to the system.
Figure 3A:
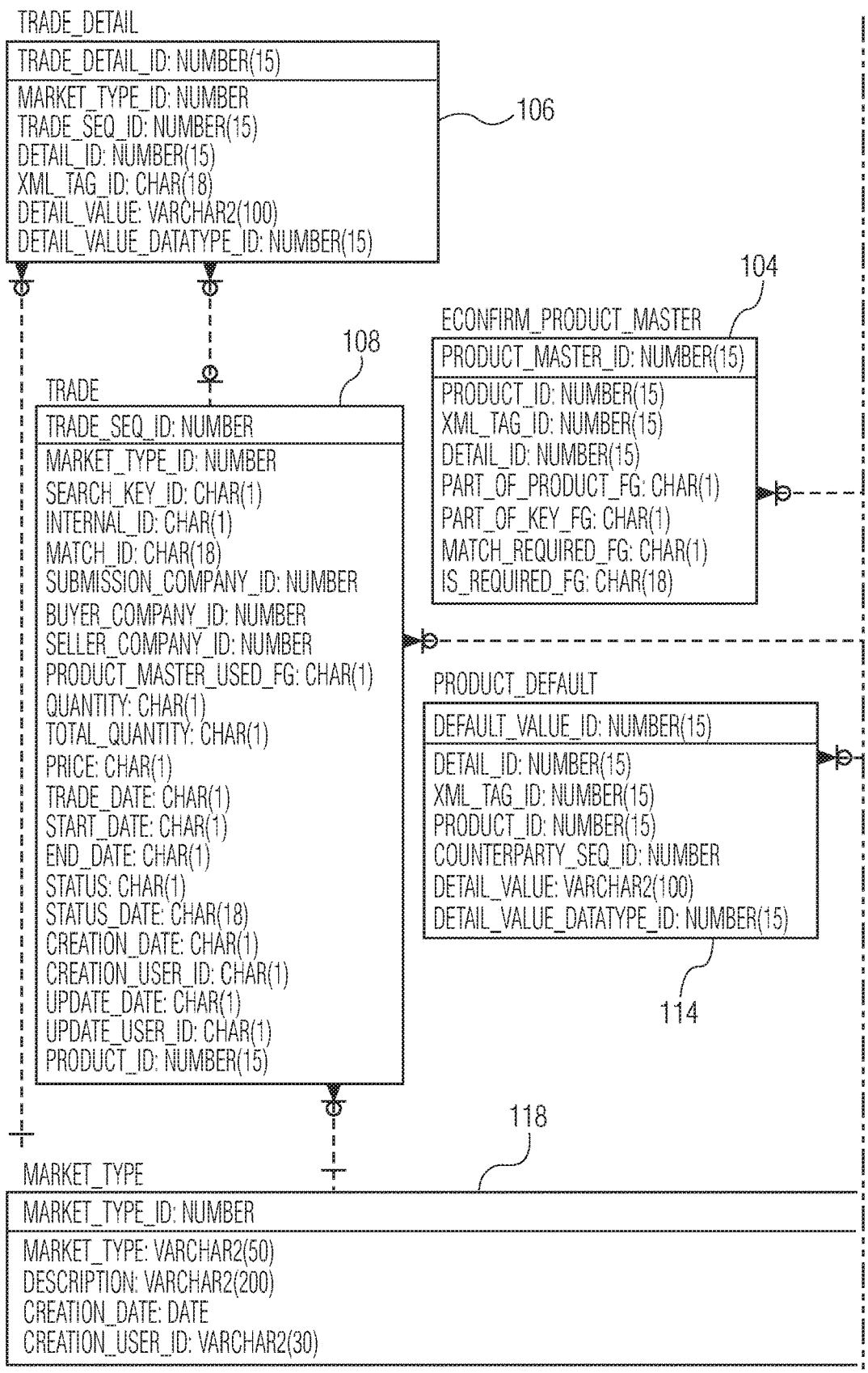
FIGS. 3A and 3B are portions of FIG. 3.
Figure 3B:
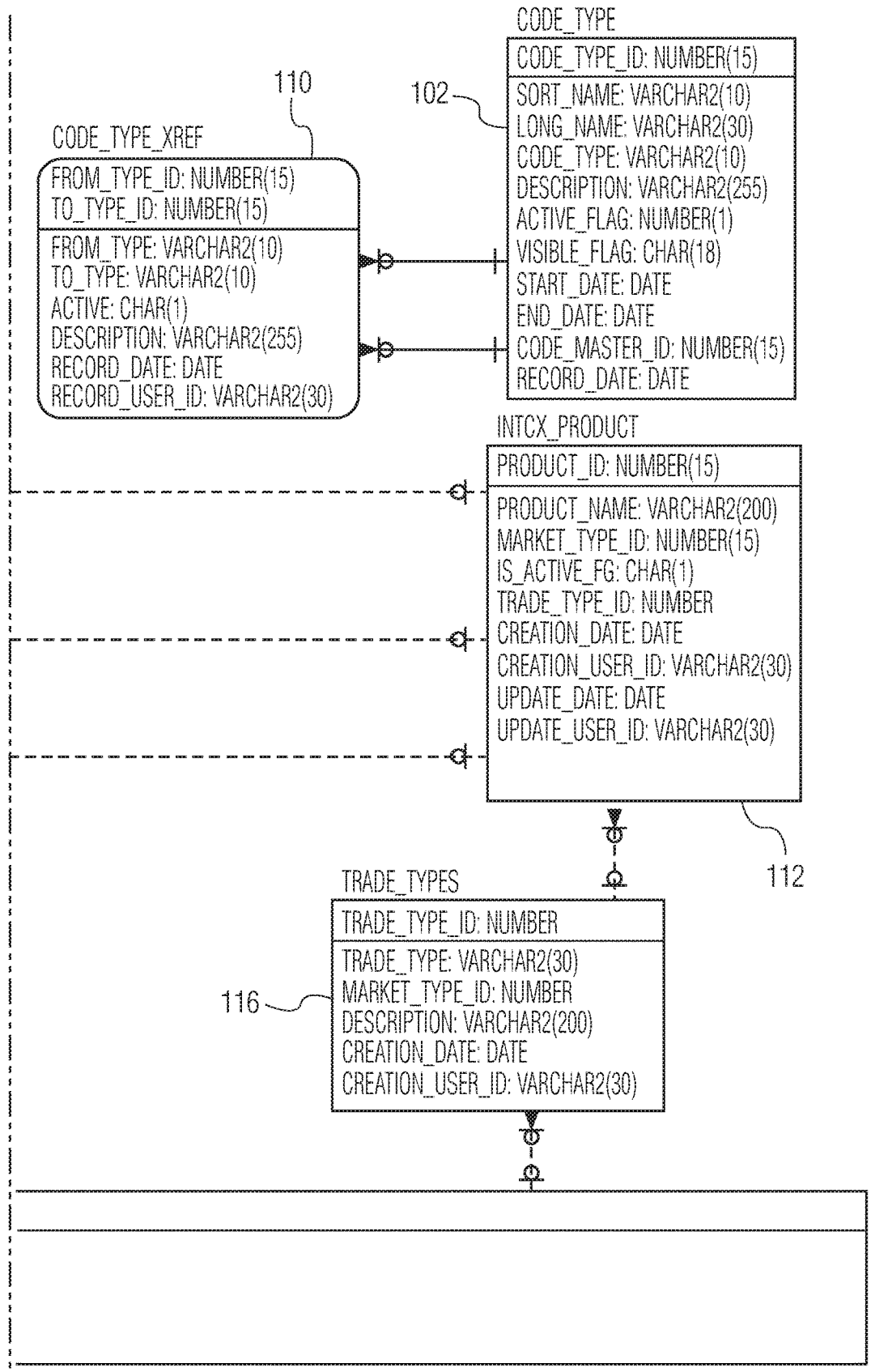

The foundation of the matching engine 14 consists of a database design supporting the definition of products and trades. The matching engine 14 employs a rules based model enabling the matching process for any defined product. FIG. 3 is a chart of a database design 100 having the tables which support the products and trades. These tables include a CODE_TYPE table 102, an ECONFIRM_PRODUCT_MASTER table 104, a TRADE_DETAIL table 106, a TRADE table 108, a CODE_TYPE_XREF table 110, a FIRM_PRODUCT table 112, a PRODUCT_DEFAULT table 114, a TRADE_TYPES table 116 and a MARKET_TYPE table 118. Each of the tables 102-118 have different data fields which support the products and trades.

These tables provide the primary functions supporting the rule based architecture of the matching engine 14. The CODE_TYPE table 102 maintains the values of all trade components identified by the business for all the products within the system 10. The PRODUCT_MASTER table 104 defines the detailed information for all associated products by identifying the product value with the components defined in the CODE_TYPE table 102. The TRADE_DETAIL table 106 defines the components of the trade which includes the association of the trade to the user's trade values defined using the CODE_TYPE table 102. The TRADE table 108 provides the header information for the trade and identifies the TRADE primary key and the user's trade identification. The trade primary key is the association key used within all other tables. The CODE_TYPE_XREF table 110 identifies the available product components defined in the CODE_TYPE table 102 to the associated market type defined in the MARKET_TYPE table 118. The FIRM_PRODUCT table 112 provides the definition of the product which includes the common definition of the product used by the system 10. The PRODUCT_DEFAULT table 114 provide the user default values for each product component and identifies the association between the component (XML_TAG) identifier in the CODE_TYPE table 102 and the component value identified in the CODE_TYPE table 102. The TRADE_TYPES table 116 provides the definition of specific trade types and associated market types. The MARKET_TYPE table 118 provides the definition of each market type supported by the system 10.

The PRODUCT_MASTER table 104 defines the primary product category. The matching process utilizes the customer defined rules stored in the PRODUCT_MASTER table 104 as matching criteria for trades between two companies. This matching process occurs within the database of the matching engine 14 after the trade validation process.

The basis of the matching engine 14 revolves around the identification of the XML tag. The XML tag provides the definition of each product characteristic and identifies the matching criteria used by the matching engine 14. Each product includes one or more characteristics that define the matching criteria. These characteristics, or XML tags, define the make up of the matching components of each product and support the matching criteria of each trade. The product definition and matching criteria reside within the PRODUCT_MASTER table 104. The table 104 includes a PRODUCT_MASTER ID field which is the primary, unique identification of the product master component. A PRODUCT_ID field is the product associated with the product component. An XML_TAG_ID field identifies the component or components of the product master. A DETAIL_ID field identifies a default or standard value for the component. A PART_OF_PRODUCT_FG field defines the products which default to the product master value as defined in DETAIL_ID. A PART_OF_KEY_FG field identifies the primary matching criteria that comprises the main components of the trade. A MATCH_REQUIRED_FG field defines the secondary components of the matching criteria that determines the final and more detail components of the trade. An IS_REQUIRED_FG field identifies components required within the product definition.

The complete definition of the components relies on the unique relationship between the product definition and the CODE_TYPE table 102. The CODE_TYPE table 102 provides a single physical object supporting a large number of logical objects with the same internal attributes, such as the component definitions. The CODE_TYPE table 102 provides a common definition and identification for these components. For the architecture of the system 10, the CODE_TYPE table 102 supports the definition of the XML tabs, as well as the components and the component values. The CODE_TYPE table 102 supports the component values as most component values consist of predefined values. Therefore, the values of the XML tag, components and component values consist of the same structure and correlation to the CODE_TYPE table 102.

The CODE_TYPE table 102 includes a correlation of the XML tags and components. The CODE_TYPE table 102 includes a CODE_TYPE_ID field which correlates with the XML_TAG_ID and DETAIL_ID defined below. A CODE_TYPE_ID field includes a XML_TAG_ID field which is the identifier corresponding with the component and identifying the component type and a DETAIL_ID field which is the identifier of the CODE_TYPE corresponding with the value of the component. A SHORT_NAME field is the short description or identification of the code type defining the component or component value. A LONG_NAME field is the complete description or name of the component or component value.

The trade validation process reviews submitted trade details and determines the validity of the trade details utilizing predefined criteria. The CODE_TYPE and CODE_TYPE_XREF tables 102 and 110 provide the mechanism for the predefined criteria as it identifies the valid codes or component values for each associated market type. This association structure provides validation levels using the market type, as currently performed, or other potential criteria. Other potential criteria includes product or trade type. The supporting components within the validation criteria revolve around the XML_TAG_ID and CODE_TYPE_ID fields in the CODE_TYPE table 102.

The rules definition process consists of defining the product, product components, and product default values. The product definition includes the product name and entries within the FIRM_PRODUCT table 112. The product components correlate the defined product with the multiple components or multiple entries within the PRODUCT_MASTER table 104. Each entry defines the component and component attributes, including the matching criteria, The matching criteria identifies the key components, match components, and required components, as well as the components comprising the product master and the default values of the product master components. The rules definition details the matching criteria for the matching process.

The matching process associates two distinct trades from two separate companies identifying a successful transaction between two companies. The matching process includes a key match and a component match. The key match identifies a subset of potential matching trades using the product components identified with a value of 'Y' in the PART_OF_KEY_FG field of the PRODUCT_MASTER table 104. These trades with matching key components identify unmatched trades and define a subset of potential matching trades, The completed match between two distinct trades successfully match when all components of the product and trades match on the components with a 'Y' in the MATCH_REQUIRED_FG field of the PRODUCT_MASTER table 104. These components match the XML_TAG_ID and DETAIL_ID of the PRODUCT_MASTER and TRADE_DETAIL tables 104 and 106, based on the product and market type.

The matching process must match all components identified as MATCH_REQUIRED and PART_OF_KEY fields in the PRODUCT_MASTER table 104 and contain matching values for each of these components for two trades. For trades matching this criteria, the first two trades, identified by the date/time component of TRADE_DATE, comprise a matched trade. The following sections are identified by the step by step process of the matching engine 14.

FIGS. 4A-4D show a flow diagram of the process followed by the matching engine 14 and the processing system 12. The beginning of the user upload process is performed in step 122, where external validation provides initial user feedback identifying valid trade components using the information accessed from the PRODUCT_MASTER and the CODE_TYPE tables 104 and 102. This process also prepares the trade components for transfer to the matching engine 14.

The processing system 12 then identifies the transfer of the company trade from the XML format to the database structure in step 124. This transfer utilizes an object structure and uses Oracle's Advanced Queuing for performance to submit data to the Oracle database. The matching engine 14 reads the trade object from the queue and begins processing the queue using the TRADE_ACTION attribute of the trade object. The TRADE_ACTION values are either 'CANCEL' or 'SUBMIT' which identify the cancel action or insert action respectively.

The matching engine 14 determines if the trade action value is 'CANCEL', identifying the trade object as a cancel request from the customer in step 126. If the trade object is a cancel request, the processing continues to step 128, which starts the cancel process, defined in FIG. 4C. If the trade status value is not 'CANCEL', processing continues to step 130.

The other valid trade action is 'SUBMIT', which indicates the trade is either an insert or update trade request. The matching engine 14 determines whether the trade exists, defined by the trade date and the customer's trade number in step 130. If the trade exists, the request is an update trade request and the processing continues to step 132, which is an update trade routine that is continued in FIG. 4D. Otherwise, the trade does not exist and the matching engine 14 continues to step 134 which provides additional validation, defines the Trade ID field and sets the initial trade status to pending. While processing the trade action, the engine 14 inserts the appropriate trade values into the TRADE table 108 and the TRADE_DETAIL, table 106 and continues to step 136.

The initial matching process in step 136 identifies a subset of trades which match on a primary subset of components, identified as key values within the PRODUCT_MASTER table 104. This process identifies all trades with matching key values, using the current trade object as the match source and all stored trades with a status of pending or unmatched. All target trades that match the source trade on these values are considered unmatched with the source trade. The process sets an internal flag distinguishing the subset of target trades from other trades only for this matching transaction and continues to step 138. The matching engine 14 uses the PRODUCT_MASTER table 104 and identifies all components identified as 'MATCH_REQUIRED' which match between the source and subset of the target trades in step 138. The process then continues with step 140 which loops to FIG. 4B.

The matching engine 14 then determines if the matching process consists of key matches, unmatched. or component matches, matched, in step 142. If any of the 'MATCH_REQUIRED' components do not match, as specified by the PRODUCT_MASTER table 104, then the source trade is unmatched with the subset target trades and processing continues to step 144. The matching engine 14 determines if the target trades are currently unmatched with other trades in step 144. If the target trades are currently unmatched, the source trade is unmatched with the unmatched group and the source trade receives a MatchID value of the target trades in step 146. If the target trade or trades do not have a MatchID setting, then the matching engine 14 generates a new MatchID in step 148. The matching engine 14 then proceeds to step 150, which sets the MatchID for the trades and sets the status to unmatched for the trades.

If all components match based on the settings in the PRODUCT_MASTER table 104, source trade and identified target trades in step 142, the matching engine 14 determines whether there is more than one match in step 152. There can only be one target trade and one source trade of a match; thus if there is more than one matching trade in step 152, the matching engine 14 identifies the earliest trade based on the trade date as the target trade in step 154 and then continues processing to step 156. If there is only one target trade, processing continues to step 156.

The matching process supports matches with both pending and unmatched target trades. The matching engine 14 determines the current status of the target trade and manages the disposition of the target trade based on the status. The matching engine 14 determines whether the trade is matched with an unmatched trade in step 156. If the status is pending i.e. no match with an unmatched trade is determined in step 156, the matching engine 14 branches to step 158 which identifies a new MatchID using an Oracle sequence. If the target trade is unmatched, i.e. a match with an unmatched trade is determined in step 158, then the matching engine 14 starts the disposition process for the unmatched target trade and the trades unmatched with the target trade in step 160.

The disposition process begins with step 160, which determines the depth of the unmatched trade. The matching engine 14 determines if there are other trades identified as unmatched trades between the submitting companies of the source and target trades in step 160. If there are not other unmatched trades between these two companies, the matching engine 14 performs the preliminary steps of the matching process between the trades and cleans up the remaining unmatched trade. The matching module identifies the partner to the target trade, resets the status to pending and resets the MatchID of the partner to zero (0) in step 162. The matching engine 14 then identifies the existing MatchID of the target trade as the new MatchID of the matched trade between the source trade and the target trade in step 164.

If there are other unmatched trades between these two companies in step 160, the matching engine 14 identifies a new MatchID by generating it using an Oracle sequence in step 166. Following steps 158, 164 and 166, the matching engine 14 continues processing in step 168, which creates the Match association. In step 168, the matching engine 14 performs the final match by setting the MatchID for both the source and target trade and sets the status of the source and target trade to matched. The transaction is committed and processing passes back to the trade process.

Figure 4A:
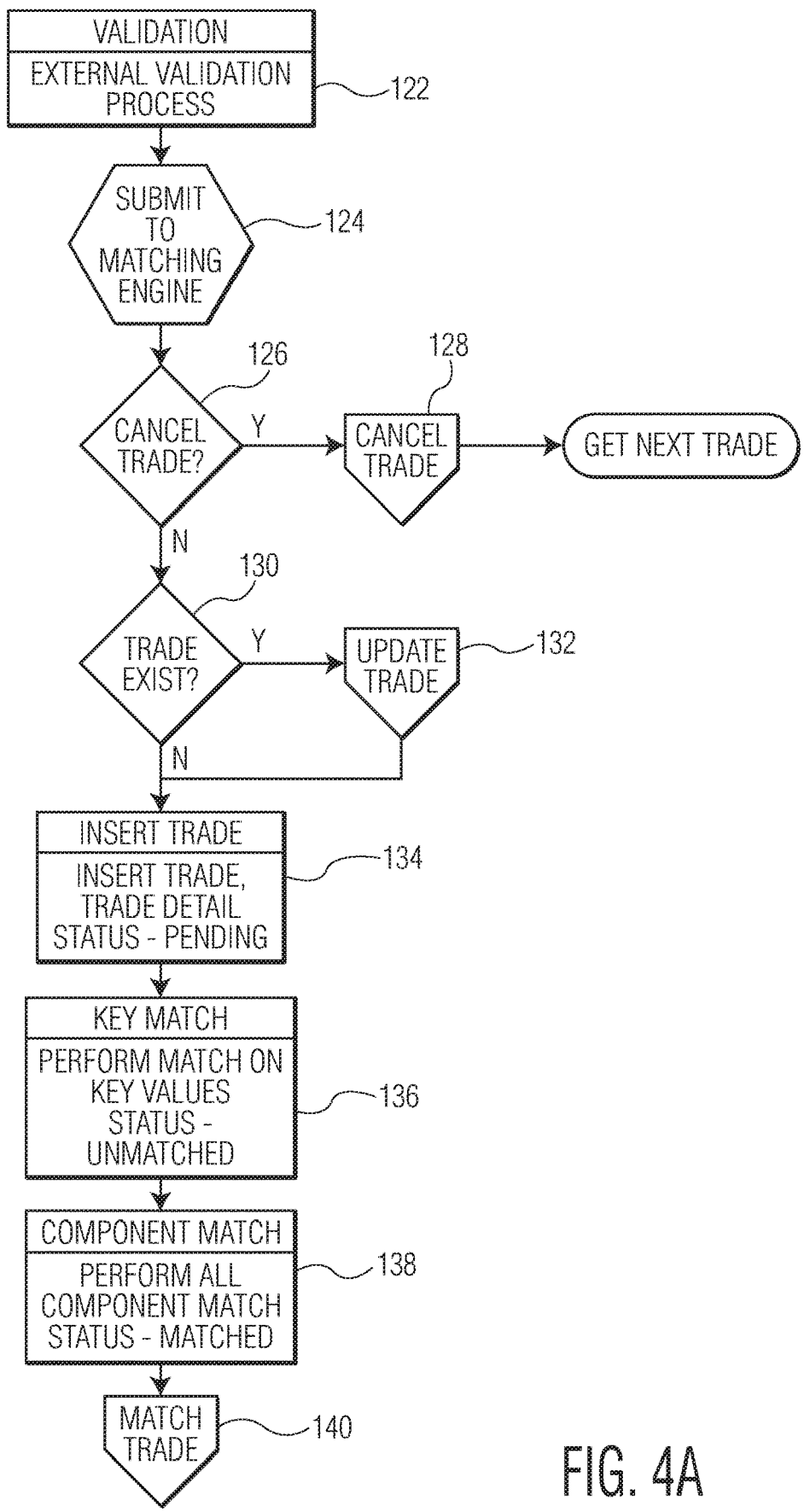
FIGS. 4A-4D are flow diagrams of the process performed by the matching engine in FIG. 2.
Figure 4B:
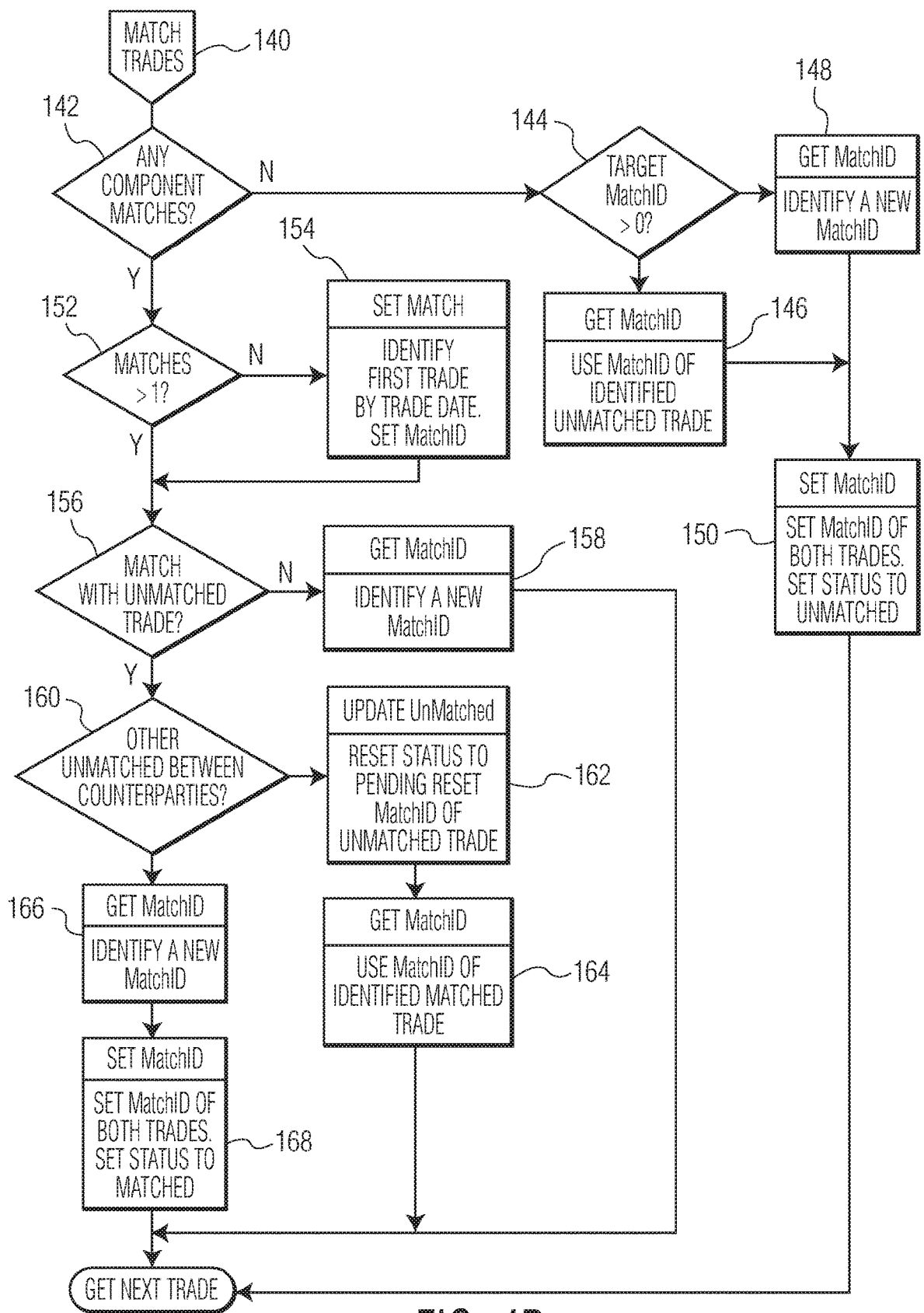
Figure 4C:
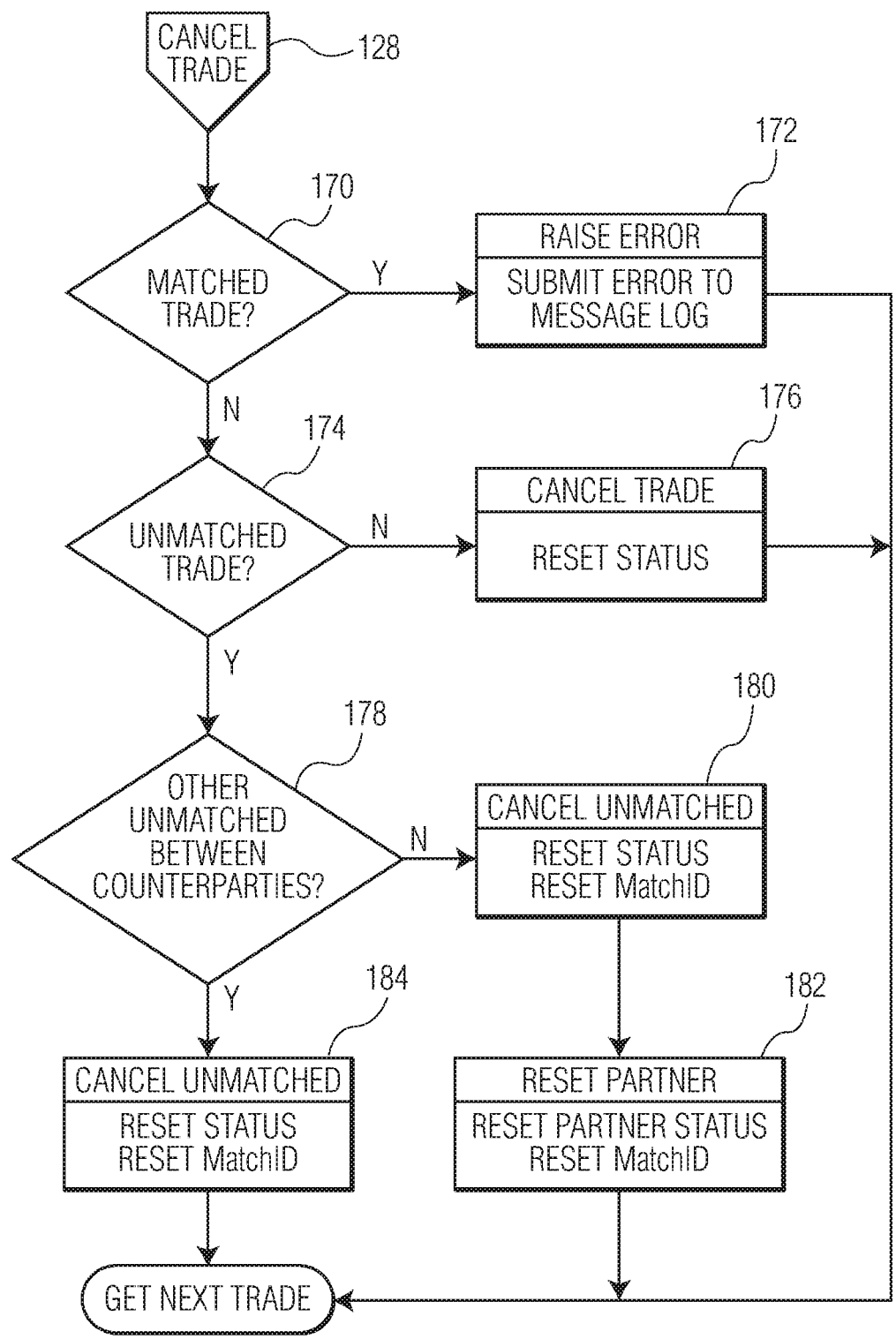

FIG. 4C identifies the steps associated with processing a cancel request from the customer trade submission from step 128 of FIG. 4A. The matching engine 14 validates the trade as a potential cancel prospect, determining if the trade is a matched trade in step 170. If the trade is a matched trade, the trade is not canceled by the matching engine 14, as both counter parties of the matched trade must approve the cancellation of a matched trade. If the trade is matched, the processing continues to step 172, which writes an error to a message log table stored in the database 74 and proceeds to the next trade. If the trade is not a matched trade in step 170, the processing begins the cancellation process.

The cancellation process consists of resetting the status of the source trade and potential unmatched trades. The matching engine 14 determines if the trade is unmatched in step 174. If the status of the trade is not unmatched, the status of the source trade is set to canceled in step 176 and the routine branches to process the next trade. If the trade is unmatched in step 174, the processing determines the fate of the partner(s) of the source trade by identifying the depth of the unmatched trades, determining if there are other trades identified as unmatched between the submitting companies of the source trade in step 178. If there are not other unmatched trades between the companies, the trades are canceled and cleaned up. The cancellation of the trade is performed in step 180 which sets the status of the source trade to canceled and resets the value of the MatchID to zero (0). The matching engine 14 then proceeds to step 182 which identifies the partner trade(s) of the source trade from the other company, resets the MatchID to zero (0) and resets the status of the trade to pending.

If there are other trades between the submitting companies in step 178, the status of the source trade is reset to canceled and the MatchID is reset to zero (0) of only the source trade in step 184. Upon completion of the cancellation process in steps 182 or 184, the processing terminates and begins processing the next trade.

Figure 4D:
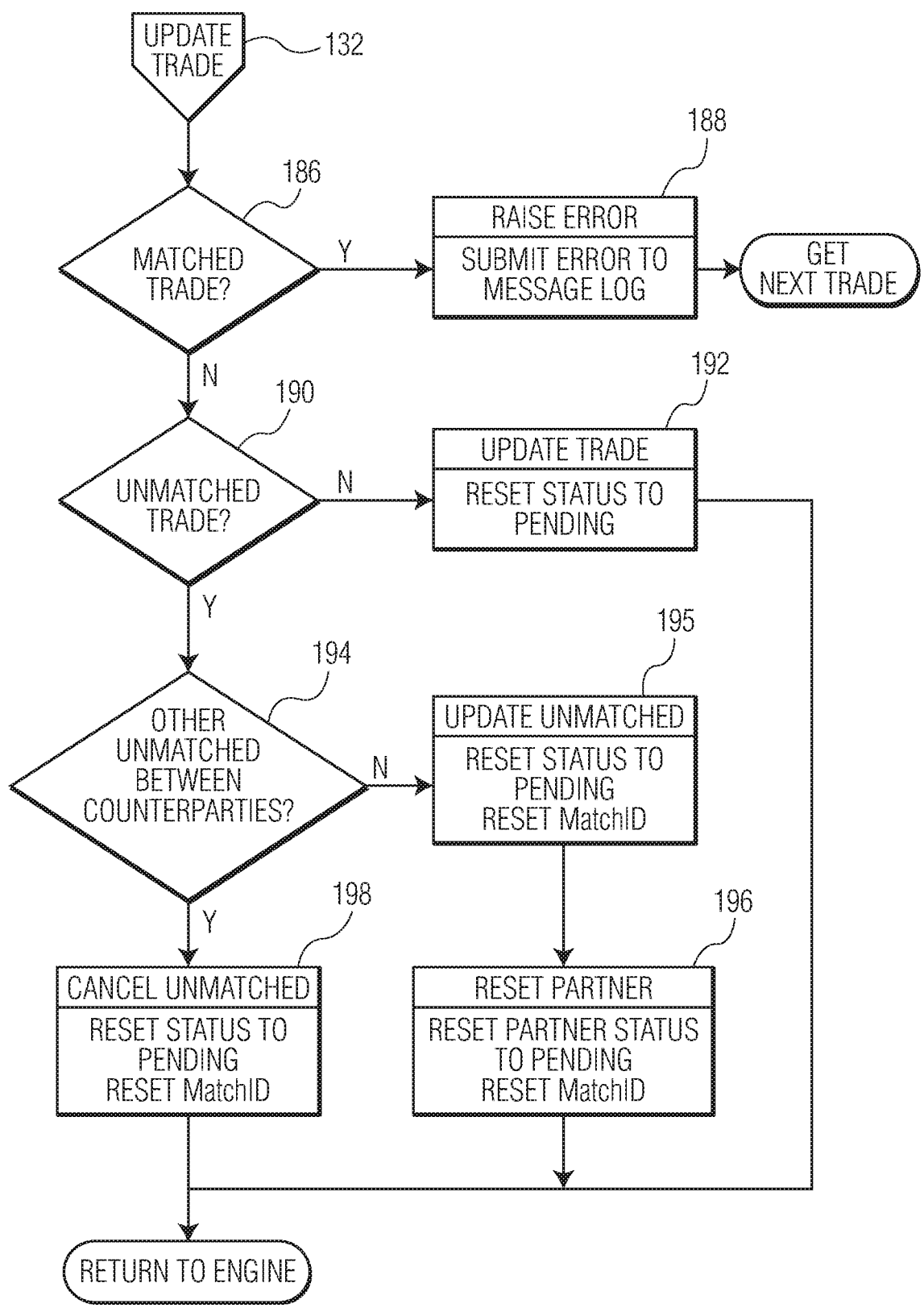

FIG. 4D identifies the steps associated with an update trade request from the customer trade submission. Step 132 identifies the entry point of the update process from FIG. 4A and begins by identifying the status of the trade as matched in step 186. If the trade status is matched, as identified by step 186, the trade cannot be updated, since the update may change a component required by the matching criteria and is not supported by both parties of the trade. If the trade is matched, the processing continues to step 188 which writes an error to the message log and exits to the matching routine to process the next trade.

If the status is not matched, the matching engine 14 updates the trade process and the identification of the affected trades of the transaction. The matching engine 14 determines if the trade is unmatched in step 190. If the trade status is not unmatched the status is reset to pending in step 192 and the processing routine exits to process the next trade. If the source trade status is unmatched in step 190, the matching engine 14 determines if there are other trades identified as unmatched between the submitting companies of the source trade in step 194. If there are no other unmatched trades between the companies, the matching engine 14 performs the update and clean up of the identified trades. The update of the source trade is performed by setting the status of the source trade to pending and resetting the value of the MatchID to zero (0) in step 195. The matching engine 14 then identifies the partner trade(s) of the source trade from the other company, resets the MatchID to (0) and resets the status of the trades to pending in step 196.

If there are other trades between the submitting companies, the matching engine 14 resets the status of the source trade to pending and resets the MatchID to zero (0) of only the source trade in step 198. Upon completion of the update process in steps 196 or 198, the processing returns back to the main engine for the actual update of the component values and re-entry to the matching process.

Figure 5:
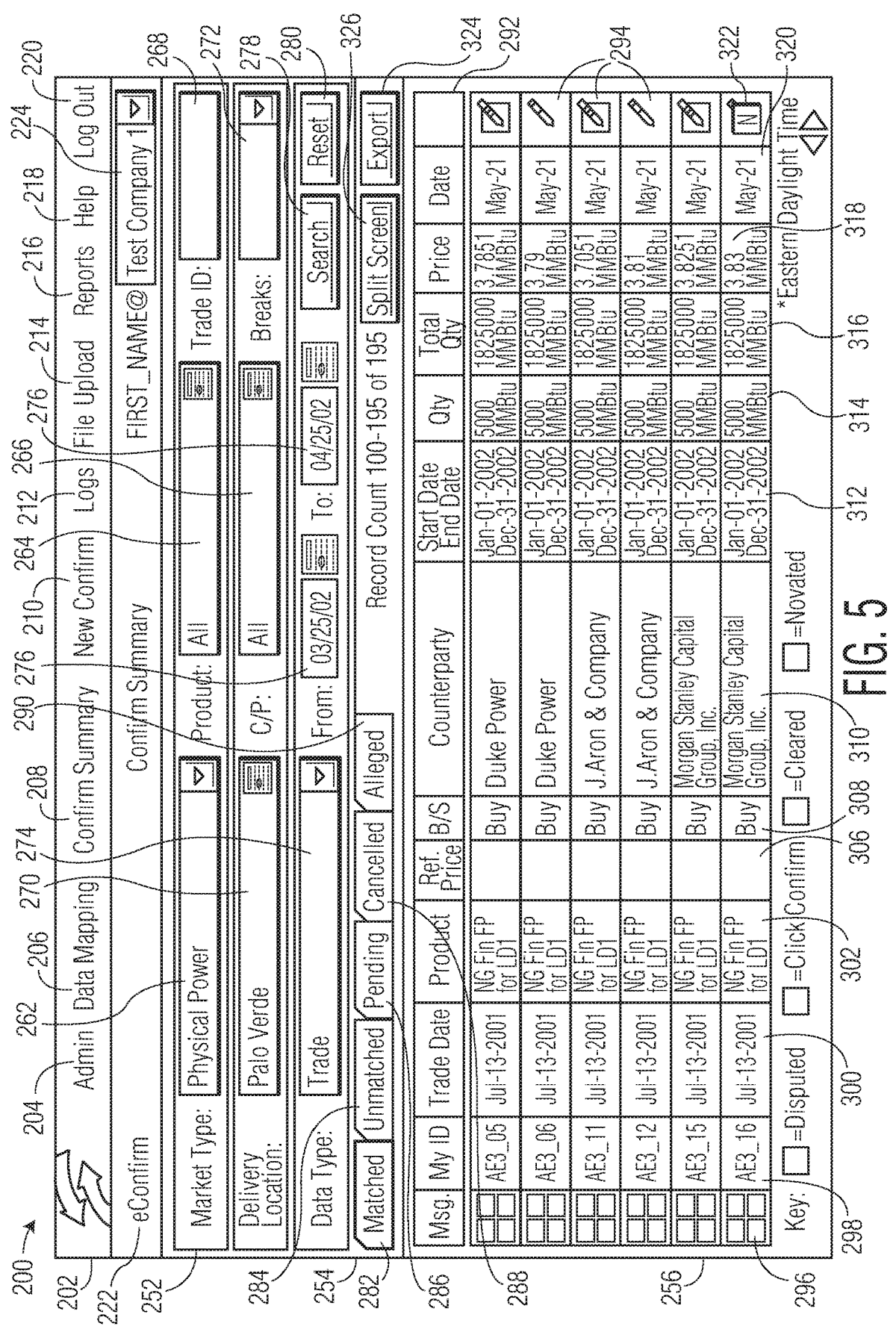

FIG. 5 shows a summary screen 200 of the program which is displayed after a user logs in and proper authorization is received. The summary screen 200 has a menu bar 202. The menu bar 202 has an administration menu option 204, a data mapping menu option 206, a confirm summary menu option 208, a new confirmation menu option 210, a logs menu option 212, a file upload menu option 214, a reports menu option 216, a help menu option 218 and a log out menu option 220. Activating the various menu options 204-220 provides functionality in the matching process described above. The menu options 204-220 are displayed on many of the subsequent screens and will be numbered the same for consistency. The help menu option 218 activates various help files while the log out menu option 220 exits the program.

The summary screen 200 and subsequent screens also have a title bar 222 which displays the menu title of the screen. The title bar 222 has a company selection box 224 which allows a user to select different subsidiaries for which summaries of trades are to be displayed on the trade screen.

After the matching process takes place, the program allows additional functionality. Logging in or selecting the summary menu option 208 from any screen results in the display of the summary screen 200 which enables a user to display the results of the matching engine in accordance with all of the trades which have been compared using the above process. The summary screen 200 also has a filter bar 252, a status tab section 254 and a summary table 256. The filter bar 252 has a drop down market type box 262, a product box 264, a counter party box 266, a trade identification box 268, a delivery location box 270, a breaks box 272, a date type box 274, a date drop down box 276, a search button 278 and a reset button 280. By selecting the arrows in a box, a pull down menu with the stored options for a particular box such as the different types of markets or products in the market type box 262 and product type box 264 are displayed. A user may thus define search criteria for trades using the pull down menus with the boxes 262-276. The user may specify a particular counter party or display trades of all counter parties using the counter party box 266. The user may find a single trade by entering the trade identification number in the trade ID box 268. The user may search by a particular delivery location or select all delivery locations in the delivery location box 270. The user may search by broken fields after a first query is made by selecting a list of unmatched fields from the breaks box 272. The user may select from a date type field as the date of the trade in the trade type box 274. The user may also select a range of dates for the date type selected in the trade type box 274 by entering date information in the trade date box 276.

Once the user has defined the search parameters and has clicked the search button 278, the details of the trades that satisfy these criteria are displayed in the summary table 256. A new search may be run by selecting the reset button 280 which clears the search fields in boxes 262-276. The trades which meet the criteria the user selects from the filter bar 252 are further separated by their status. Trades of the same status that meet the selected criteria are displayed in the summary table 256 by selecting tabs 282-290 in status tab section 254. Thus, the status tab section 254 has a matched tab 282, an unmatched tab 284, a pending tab 286, a canceled tab 288 and an alleged tab 290. Selecting any of these tabs 280-290 will display data relating to all trades that satisfy the search criteria and all trades of that status. As explained above, selecting the matched tab 282 will display all trades in the summary table 256 that have all matchable fields matched and both trader and counter party are in agreement with the confirmation details. The confirmation details agreed and match upon depend on the particular product.

Selecting the unmatched tab 284 will display all trades in the summary table 256 that have all key fields matched and one or more of the non-key fields unmatched. Selecting the pending tab 286 will display all trades in the summary table 256 that do not have all key fields matched. The counter party for the confirmed pending trades will see those trades under their alleged trades. Selecting the canceled tab 288 will display all trades in the summary table 256 that have been chosen by the user to be canceled. Selecting the alleged tab 290 will display all trades in the summary table 256 which have been alleged to the user by the counter party. These trades are displayed to the counter party as pending if the counter party accesses the program.

The summary table 256 has various information from data fields which may be displayed relating to the selected trades under the status of the selected tabs 282-290. In this example, the summary table 256 has all matched trades (from selecting tab 282) which are of the market type physical power (selected from box 262), of all product types (selected from box 264), with Palo Verde as a delivery location (selected from box 270) and for the dates between Mar. 25, 2002 to Apr. 25, 2002 (selected from box 276). The summary table 256 has a headings row 292 which displays different types of information. Different trade rows 294 under the headings row 292 represent different trades and the information from the data fields relating to those trades. The information in the headings row 292 depends on the market selected.

In the example in FIG. 5, the information displayed in each of the trade rows 294 is specific to the physical power market and includes a message column 296, an internal identification number column 298, a trade date column 300, a product traded column 302, a reference price column 306, a buy/sell selection column 308, a counter party column 310, a start and end date column 312, a quantity column 314, a total quantity column 316, a price column 318, a date column 320, and a notes column 322. These data fields are selected to provide the best overview of the trade details. Of course, other data fields such as delivery location may be displayed in the summary table 256.

The user may view the message column 296 to determine whether any flags are indicated for a specific trade. These flags indicate whether a trade is disputed, click and confirmed, novated or cleared. A disputed trade is a transaction where all data fields are matched but one of the parties does not agree that the trade occurred. A click and confirmed trade is a trade that one user chooses to accept the trades alleged to them, and then clicks on the screen to confirm, rather than submitting the actual matching data through the matching engine 14. When user clicks to confirm the trade, a match to the alleged trade is generated by the system 12, and the trade moves in its pair to the matched status. A novated trade is a trade that has been processed through the matching engine 14, deemed matched, and passed on to a clearing house such as the LCH. A novated trade cannot be disputed or canceled. A cleared trade is a trade that is sent into the system 12 and noted as cleared. This trade, once matched, will be processed and sent on to a clearing house.

The notes column 322 contains various icons which indicate various comments that are electronically associated with the page. An icon with a pencil indicates that a no comments have been attached to the trade, an icon with a pad and pencil indicates that the comment has been read and an icon with a pencil inside a notebook indicates that the comments have not been read. The information in the summary table 254 may be imported to a spread sheet by selecting an export button 324. A split screen button 326 provides a user with the option of splitting the screen and displaying a second summary table 256 for purposes of comparisons.

All of the data fields relating to a trade may be displayed by selecting the trade identification of a trade in the rows 294 of the summary table 256 in FIG. 5. FIG. 6A shows a pending trade details screen 350 that is displayed on selecting a specific pending trade from the screen 200 in FIG. 5. The pending trade details screen 350 has the title bar 222 and an alleged trade details table 352. The alleged trade table 352 has a status column 354, a data field column 356 and a value column 358. The data field column 356 lists all of the data fields relating to the trade that is displayed if a pending trade is selected from the summary table 256 in FIG. 5. The values of the data fields from the user (trader) are displayed under the value column 358. The user may view the status column 354 to determine the matching significance of a particular data field. For example, a PM flag (PM) indicates that only one value is applicable for that product in that data field. Fields with the PM flag represent data that is derived from the product master values, for example, reference price or quantity unit. Such fields will automatically be designated by the data values from the product master. In addition, other fields which have default values will be assigned the default value initially.

A K flag indicates the data field is a Key field and required for first level matching. These fields include buyer, seller, price or quantity. An R flag indicates the field is Required for second level matching such as payment from or pricing frequency. An I flag indicates that the data field is for informational purposes only such as the broker or trader identity. Finally, an * indicator on any flag indicates the data field is required for submission.

Arrow buttons 360 and 362 allow a user to move to the previous or next trade in sequence and display the details of that trade in the trade table 352. An edit button 364 allows a user to edit the details of the trade by selecting a new value in the value column 358 for any data field under the data field column 354. A cancel button 366 allows a user to cancel pending trades which are submitted. Selecting the cancel button 366 will result in a pop-up screen asking the user to confirm the cancellation.

FIG. 6B is a trade details screen 370 accessed for matched or canceled trades. The trade details screen 370 displays all values of both sides of the trade for each of the data fields. The trade details screen 370 has the title bar 222 and a user trade table 372 and a counter party table 374. The user trade table 372 has a status column 376, a data field column 378 and a value column 380. The counter party table 374 has a value column 382 that corresponds with the data fields listed in the data field column 378. All matchable required fields will match between the parties on the screen 370 in the case of a matched trade. As in the case of the details screen 350 in FIG. 6A, the user may view the status column 376 for a flag to determine the matching significance of a particular data field. A user may scroll to the next or previous trade using arrow keys 360 and 362.

The matched trade details screen 370 allows a user to dispute a trade via a dispute button 384. The dispute button 384 is not present if the trade is canceled. By selecting the dispute button 384, the user may elect to flag the matched trade as in dispute between the parties. An indicator of a disputed trade will then be displayed in the summary table 254 in FIG. 5.

FIG. 6C is a trade details screen 390 accessed for unmatched trades. The trade details screen 390 displays all values of the trade for the user and any other parties for each of the data fields. The trade details screen 390 has the title bar 222, a user trade table 392 and a counter party table 394. The user trade table 392 has a status column 396, a data field column 398 and a value column 400. The counter party table 394 has a value columns for each alleged trade which may match the trade in the user trade table 392. In this case there are three alleged value columns 402, 404 and 406 each of which have values corresponding with the data fields listed in the data field column 398. All matchable required fields will match between the parties on the screen 370 in the case of a matched trade. As in the case of the details screen 350 in FIG. 6A, the user may view the status column 396 for a flag to determine the matching significance of a particular data field. A user may scroll to the next or previous trade using arrow keys 360 and 362.

The data values that do not match between the two tables 392 and 394 will be highlighted as shown in a row 408 which is the pricing frequency data field. In the preferred embodiment, such values will be placed in a signifying color. Of course it is to be understood that other signifying symbols may be used such as bolding, underlining, flashing, etc. The details screen 390 also allows a user to edit the unmatched trades via the edit button 364 and the cancel button 364 as explained above.

FIG. 6D is a trade details screen 410 accessed for pending trades. The trade details screen 410 displays all values of the pending trade for the user. The trade details screen 410 has the title bar 222 and a user trade table 412. The user trade table 412 has a status column 414, a data field column 416 and a value column 418. As in the case of the details screen 350 in FIG. 6A, the user may view the status column 414 for a flag to determine the matching significance of a particular data field. A user may scroll to the next or previous trade using arrow keys 360 and 362. The details screen 410 also allows a user to print the screen and corresponding data fields by selecting a print button 420. The user may also confirm the trade without submitting his or her own trade details by selecting a confirm button 422.

Figure 7A:
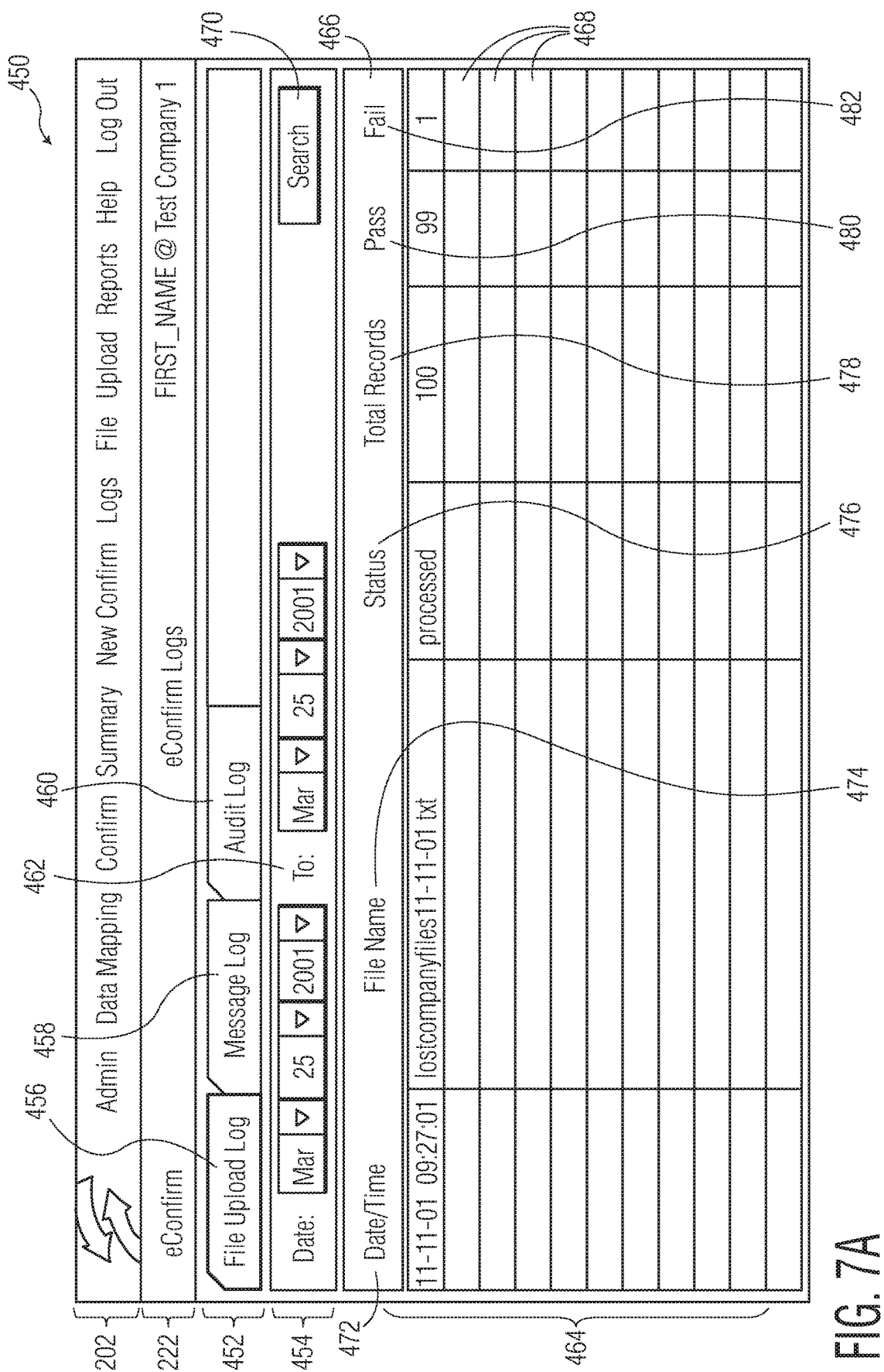
FIG. 7A is a file upload log screen which is a user interface to the confirmation system of FIG. 1.

Returning to the menu selections of any screen such as the screen 200 in FIG. 5, selecting the logs menu option 212 allows a user to display a log screen 450 shown in FIG. 7A. The log screen 450 has the menu bar 202, a title bar 222, a log tab section 452 and a filter bar 454. The log tab section 452 has a file upload log tab 456, a message log tab 458 and an audit tab 460. The logs may be filtered by adjusting a date range box 462 in the filter bar 454. The logs each provide various information relating to the trades processed by the program. In FIG. 7A, the log tab 456 is selected and displays a file upload summary table 464.

The file upload summary table 464 has a heading row 466 and rows of files 468 that have been uploaded in the selected date range. The rows of files 468 are updated by the date parameters selected in the date range box 462 by selecting a search button 470. The heading row 466 has a date/time column 472, a file name column 474, a status column 476, a total records column 478, a pass column 480 and a fail column 482. The date and time column 472 displays when the file was uploaded into the system. The file name column 474 displays the file name of the uploaded file. As explained above, a file may have the data fields for multiple numbers of trades. Such a file has different records with the data fields for each of the different trades. The status column 476 indicates whether the matching engine 14 has completed its processing of the trade or not. The total records column 478 displays the total number of trades stored in the file. The pass column 480 displays the number of records in the file that are compliant with the input data standards, while the fail column 482 displays the number of records in the file that are corrupted or not compliant. By selecting the fail column 482, the program will display a pop up window with the identification number of each record that failed and the reason for the failure.

A message log screen 490 which is shown in FIG. 7B is displayed by selecting the message log tab 458. The menu bar 202, title bar 222, log tab section 452 and filter bar 454 are the same as in FIG. 7A. A message log summary table 492 is displayed. The message log summary table 492 has a heading row 494 and rows of messages 496 which have been received in the selected date range. The rows of messages 496 are updated by the date parameters selected in the date range box 462 by selecting the search button 468. The heading row 494 has an expansion column 500, a message column 502, a reference ID column 504, a date column 506, a type column 508 and a code column 510. The message column 502 displays messages related to errors generated by the system due to actions such as upload, cancel, etc. The reference ID column 504 displays the trade reference identification number of the message. The date column 506 displays the date and time when the message was received from the system. The type column 508 displays an internal system tracking number and the code column 510 displays an internal reference code for use in troubleshooting errors. The expansion column 500 allows a user to expand the details of the trade by displaying additional values in the columns when a plus is selected or simply the message text when a minus is selected.

Figure 7C:
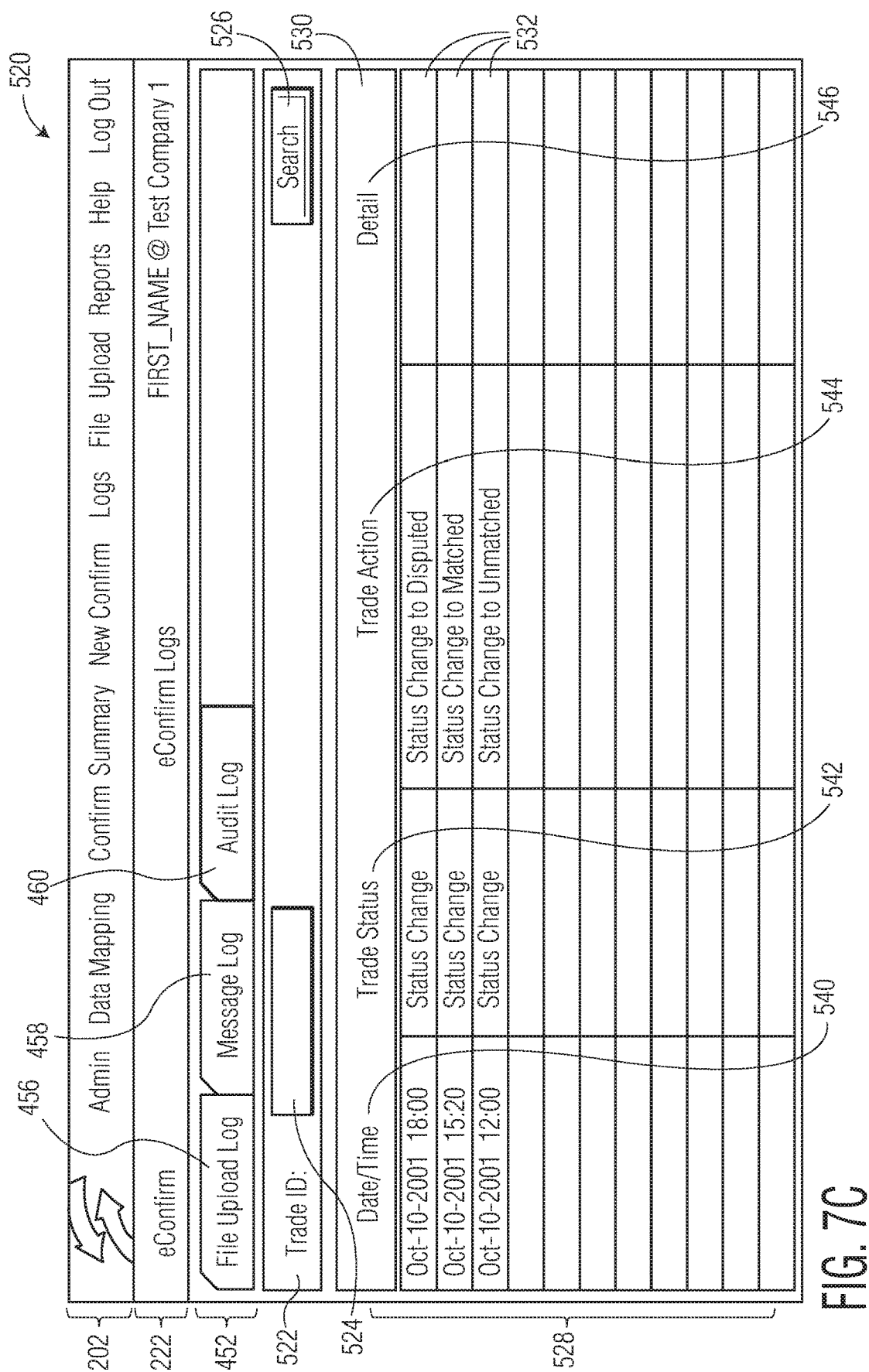
FIG. 7C is an audit log screen which is a user interface to the confirmation system of FIG. 1.

An audit log screen 520 which is shown in FIG. 7C is displayed by selecting the audit log tab 460. The menu bar 202, title bar 222 and log tab section 452 are the same as in FIG. 7A. A filter bar section 522 with a trade ID box 524 is displayed. By entering the trade identification number, a specific trade may be displayed by selecting a search button 526. An audit summary table 528 has a heading row 530 and rows of actions 532 which have been taken relating to the trade with the selected identification number. The audit data displayed allows a user to follow the life cycle of each trade that is in the program. The heading row 530 has date/time column 540, a trade status column 542, a trade action column 544 and a detail column 546. The date/time column 540 displays the date and time of the trade action. The trade status column 542 displays whether the trade is matched, unmatched, pending or canceled. The trade status column 544 describes the action taken to the trade. The details column 546 provides further information that is useful in following the cycle of the trade through the system.

Returning to the menu selections of any screen such as the screen 200 in FIG. 5, selecting the reports menu option 216 allows a user to display a report screen 550 shown in FIG. 8A. The report screen 550 has a manager's view tab 552, a breaks tab 554 and a filter section 556. FIG. 8A shows the manager's view tab 552 selected which displays a summary of the number of trades in each market type and their status. The report screen 550 has a date type box 558 that allows selection of values of particular date fields in conjunction with a date range selection box 560. A search button 562 activates the program to screen trades satisfying the date and type parameters from the filter section 556 and display relevant data on a report table 564.

In this example, the table 564 has a header row 566 and rows 568 representing different market types. The table 564 has a matched column 570, an unmatched column 572, a pending column 574, an alleged column 576, a canceled column 578 and a totals column 580. The rows 568 show the numbers of each types of trades in columns 570-580 which are referenced to the particular market type during the selected time period. A bottom totals row 582 shows the total number of each column type. An export button 584 allows the user to export the data to a spreadsheet. By selecting a particular number entry in any of the rows 568, the program will display the confirmation summary screen 200 as shown in FIG. 5.

Selecting the breaks tab 554 causes a breaks report screen 586 to be displayed as shown in FIG. 8B. The breaks report screen 586 displays the number of trades of each market type that have broken or unmatched data values. An additional counter party filter box 588 is in the filter section 556 that allows a user to filter by a specific counter party or to select all. The search button 562 activates the program to screen trades satisfying the date and counter party parameters from the filter section 552 and display relevant data on a report table 590.

In this example, the table 590 has a header row 592 and a data field column 594 with entries representing different data fields. The table 590 also has a series of columns 596 each of which represents a particular market type. A series of rows 598 show the numbers of each trade of a particular market type having a broken or unmatched data field in the data field column 594. The bottom totals row 582 shows the total number of trades in each broken data type. By selecting the particular number, the program will display the confirmation summary screen 200 as shown in FIG. 5.

Figure 9:
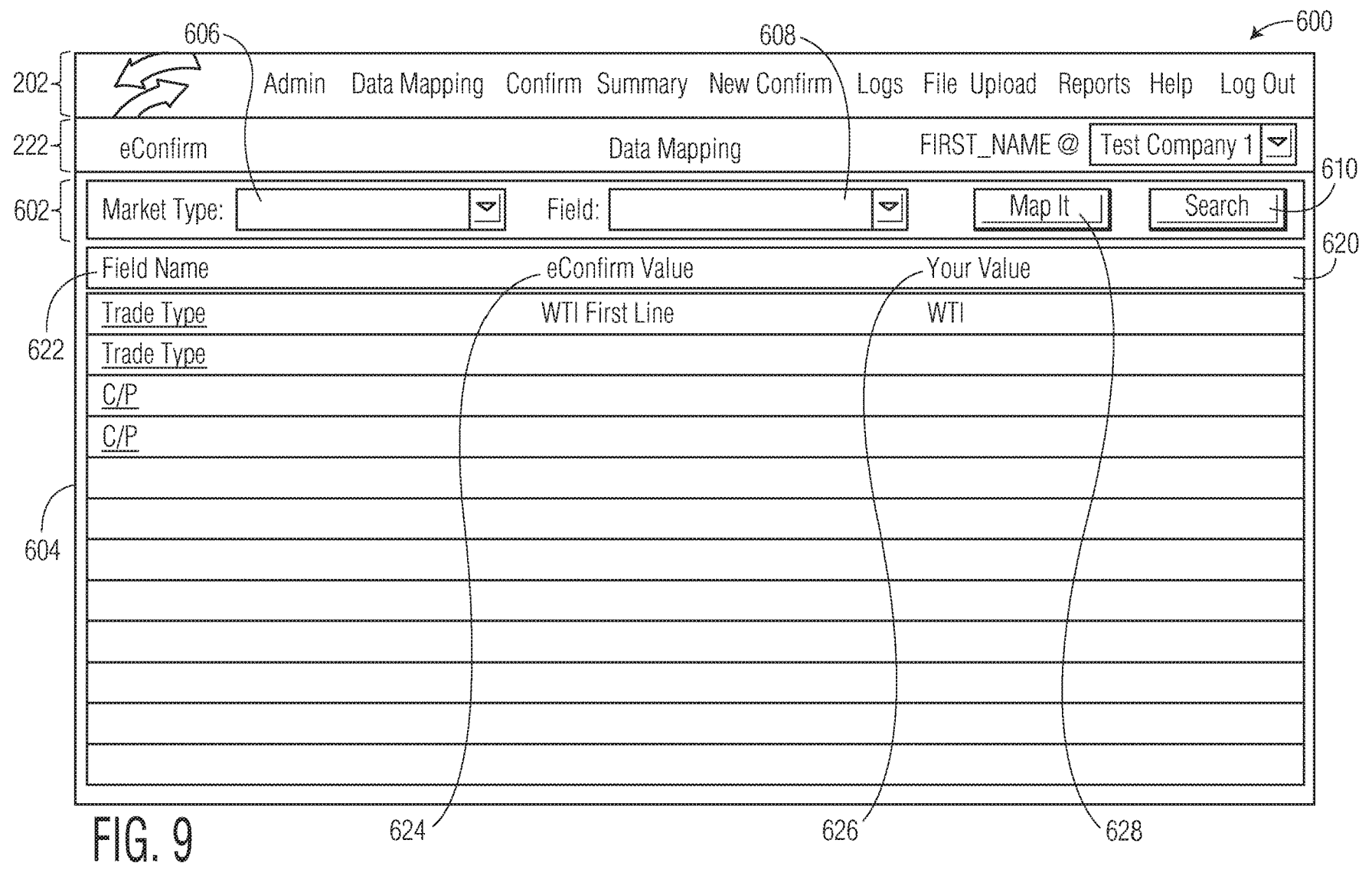

Returning to the menu selections of any screen such as the screen 200 in FIG. 5, selecting the data mapping menu option 206 allows a user to convert data values to the standard used by the system 10 via a data mapping screen 600 shown in FIG. 9. Once the data is converted using the data mapping screen 600, the matching process shown in FIG. 4 may be initiated. The data mapping screen 600 has a filter section 602 and a summary table 604. The summary table 604 displays the data field mapping which is established on the data mapping details screen as will be explained below. The filter section 602 has a market type box 606 and a field box 608. The market type box 606 allows a user to select a market type frown the types stored in the database. The field box 608 allows a user to select fields such as delivery location, counter party, pricing frequency etc. A search button 610 when selected will filter the data selected in the filter section 602.

The summary table 604 has a heading row 620. The heading row 620 has a field name column 622, a system value column 624 and a user value column 626. The data fields entered in the columns 622, 624 and 626 may be sorted ascending or descending by clicking on the column headings. In order to add a new mapped value, the user may select the market type and field via the boxes 606 and 608 and by selecting a map it button 628.

Figure 10:
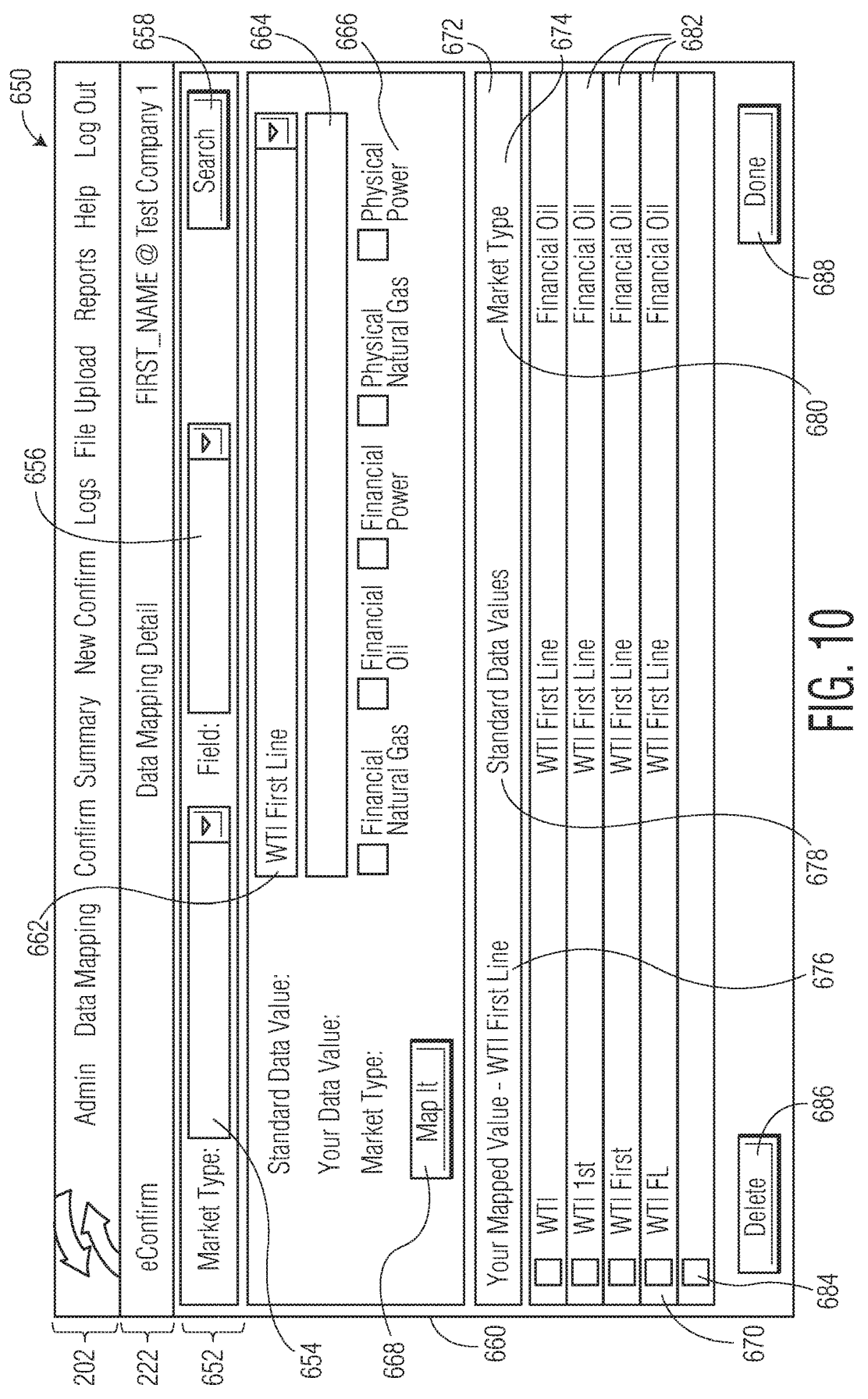

Once the map it button 628 is selected, a data mapping details screen 650 is displayed as shown in FIG. 10. The data mapping details screen 650 has a filter section 652 which has a market type selection box 654, a field selection box 656 and a search button 658. The screen 650 also has a summary table 660. The summary table 660 has a standard data value box 662, a user data value box 664, and various market type selections 666. The summary table 660 includes a map it button 668.

The user selects one field using the field selection box 656 and the market type box 654 and selects the search button 656. After the user selects the field, the standard data value box 662 is updated and provides a list of all of the standard data values for the chosen field. The user selects the desired standard value, and enters the user value in the user data value box 664. The entering of a user value activates various market type selections 666 and the user may select the market types for which the field applies by checking the boxes appearing next to each market type listed. These values are mapped to each other such that the user value is now the equivalent of the selected system value by selecting the map it button 668.

The summary table 660 has a mapped value table 670 which shows the result of the mapped value. The mapped value table 670 has a heading bar 672 which has a matching area 674 that displays a user type column 676, a standard value column 678, and a market type column 680. Each successive row 682 displays the user value that is mapped to the system value and the market type. Each row 682 has a check box 684 and the user value and the market type. The value may be deleted by checking the check box 684 and selecting a delete button 686. The user may return to the data mapping screen 600 in FIG. 9 by selecting the done button 688.

Returning to the menu selections of any screen such as the screen 200 in FIG. 5, selection of the new confirmation menu option 210 allows a user to submit confirmation information on a confirmation submission screen 700 shown in FIG. 11. The submission screen 700 represents the submission of trade data through a web enabled computer such as the computer 22 in FIG. 1. Once the trade data is submitted via the submission screen 700, the matching process described in FIG. 4 is performed to confirm the submitted trade.

A selection area 702 has a market type box 704, a product box 706, a counter party box 708 and an action box 710. The market type box 704 and product box 706 have pull down lists that allow a user to select the desired market and product. The counter party box has a pull down list which includes all known counter parties for the user to select. The action box 710 allows the user to define the trade action as either buying or selling.

After selecting a certain type of trade, a data table 720 is populated with various data values. The data table 720 has a fields column 722 and a user values column 724. The data table 720 has data rows 726 for each data field with the selected trade and a value for that data field. Each data field has a flag (PM, K, R, I or *) which signifies its importance to the matching process as explained above in FIG. 6A. Of course other indicators such as type style or color may be used to designate the status of the fields.

Certain fields such as a data field 730 which is the payment terms of the trade have a pull down menu with listed potential options for payment terms. The user may select a value from the list or enter his or her own value for the field which accepts unique values. Once a user has insured that values have been entered in all required fields, he or she may submit the trade data for confirmation by the matching engine by selecting a submit button 732. The user may close the screen 700 by selecting a close button 734.

Figure 12:
FIG. 12 is a file upload screen which is a user interface to the confirmation system FIG. 1.

Returning to the menu selections of any screen such as the screen 200 in FIG. 5, selection of the file upload menu option 214 allows a user to upload files via a file upload screen 750 as shown in FIG. 12. The file upload screen 750 represents the submission of trade data via a tab delimited file uploaded through a web enabled computer such as the computer 24 in FIG. 1. As explained, above, such a file must be written in a format with different trades in separate records that may be converted by the system to the system format.

The file upload screen 750 has an upload area 752. The upload area 752 has file selection boxes 754 and browse buttons 756, The selection boxes 754 and browse buttons 756 may be used to access the files stored on the computer or another networked computer. As may be seen in this example, up to three different files may be uploaded simultaneously; but it is to be understood that different numbers of files may also be uploaded. Once the files are selected, an upload button 758 is selected to send the files to the system.

Figure 13A:
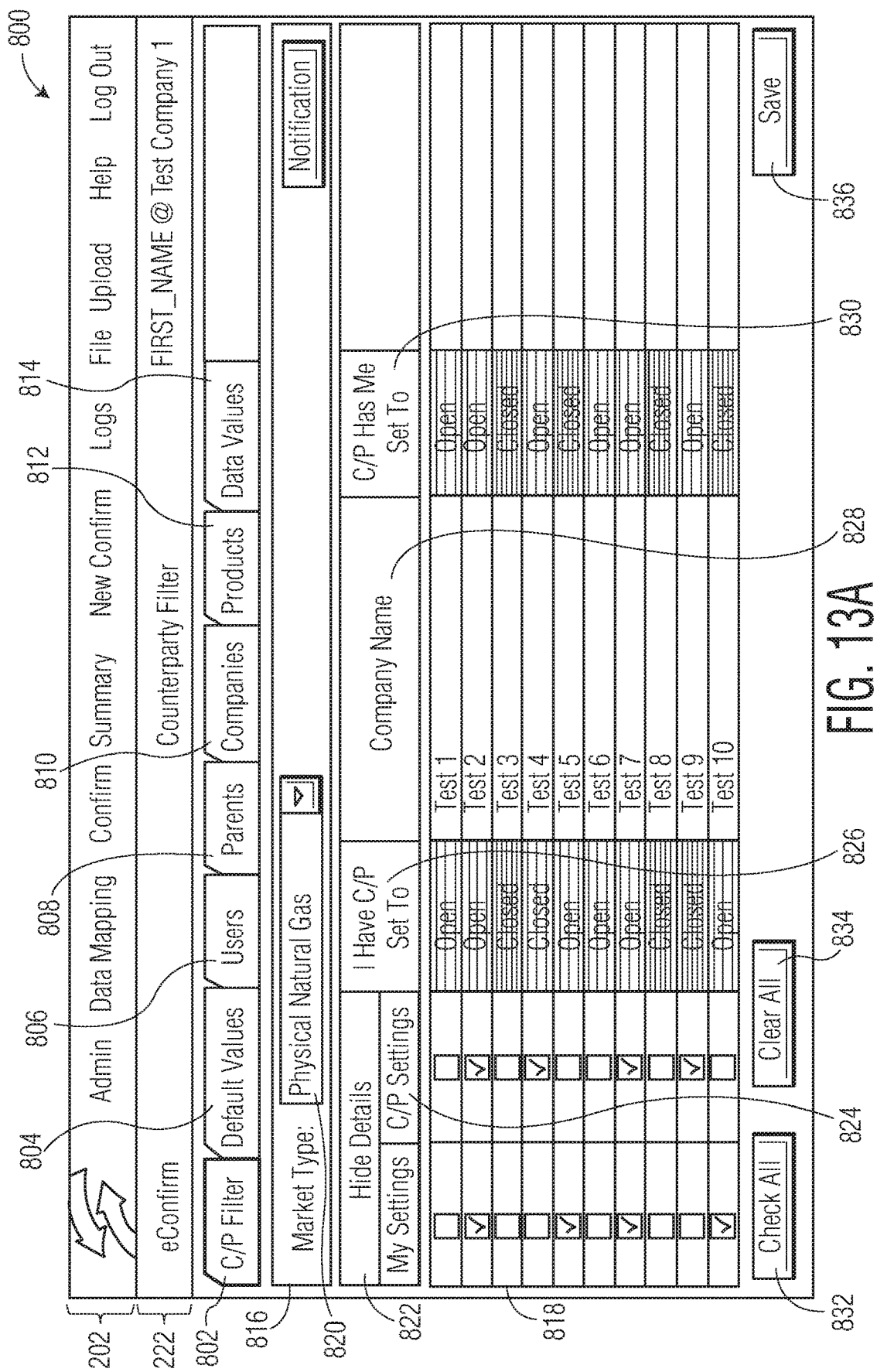
FIG. 13A is an administration screen for defining counter parties which is a user interface to the confirmation system of FIG. 1.

Returning to the menu selections of any screen such as the screen 200 in FIG. 5, selection of the administration menu option 204 allows an administrative user to manage the system via an administrative screen 800 as shown in FIG. 13A. The administrative screen 800 includes a counter party filter tab 802, a default values tab 804, a users tab 806, a parents tab 808, a companies tab 810, a products tab 812 and a data values tab 814. By selecting the user tab 806, a screen is presented to allow the user to associate a company name with system users, enter user data, add new users, set parameters for use such as the permissible market types for trades submitted by a user. The user screen may also be used to activate and deactivate users authorized for access to the system 10 as well as set passwords for those users.

By selecting the parents tab 808, a screen is displayed to allow the administrative user to change data relating to parent companies. By selecting the companies tab 810, a screen is displayed to allow the administrative user to change data relating to the companies allowed to trade. By selecting the products tab 812, a screen is displayed to allow an administrative user to change data relating to the products associated with the system. By selecting the data values tab 814, the administrative user may change the data values associated with the system.

By selecting the counter party filter tab 802, the screen 800 is displayed with a filter bar 816 and a summary table 818. Before trade data is accepted from a counter party, a counter party filter must be set up via the screen 800 that allows confirmations between various counter parties and traders. The filter bar 814 has a market type box 820 that allows the selection of a particular market type to classify counter parties. The summary table 818 has a user settings column 822, a counter party settings column 824, a user set counter party to column 826, a company name column 828, a counter party has user set to column 830. Once the market type is selected via the market type box 820, a list of companies (counter parties) will be listed in the summary table 818. The user settings column 822 is used to hide fields containing economic values that are sent to the counter party for which the user does not have a match and which appear as alleged trades. This functionality is used to protect fields such as price, quantity, total quantity, start date, end date, etc. from being seen by a counter party a user may not be familiar with. Similarly, the setting column 824 is a read only column which displays whether the counter party has hidden these details. Both the user and the counter party must leave the respective settings columns 822 and 824 as not hidden in order for both to view price, volume and trade durations fields from the alleged screens.

The user set counter party to column 826 is used to enable or disable confirmation of trades with the counter party. The counter party has user set to column 828 is read only and shows the status that the counter party has designated the user to either enable or disable confirmation of trades via the system. In order to confirm trades both the user and the counter party must set the columns 826 and 828 to yes or enable.

A check all button 832 enables a user to check all the boxes at the same time. A clear all button 834 enables a user to clear the checks from all the boxes at the same time. A save button 836 allows a user to save the settings for the counter parties shown in the summary table 818.

Figure 13B:
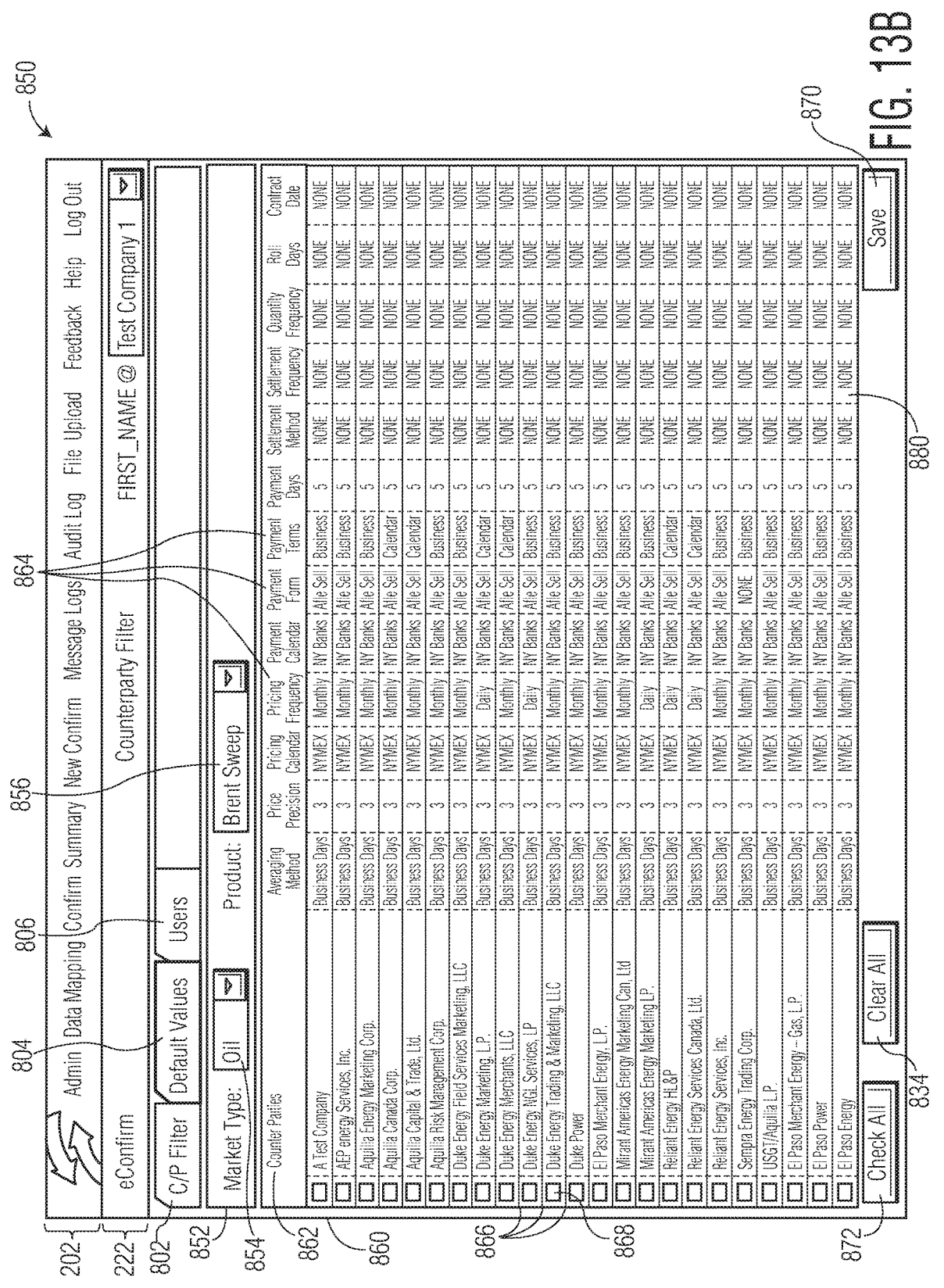

The capability to change data information in the display shown in FIG. 13A depends on the user's status. If a user has an administrative level clearance, more values may be changed via the tabs 802-814. If a user is a normal user, a screen such as the default values screen 850 shown in FIG. 13B is displayed. The default values screen 850 in FIG. 13B only has the counter party filter tab 802, the default values tab 804 and the users tab 806. Since the user in this example is only a normal user the parents tab 808, the companies tab 810, the products tab 812 and the data values tab 814 in FIG. 13A are not displayed. By selecting the counter party filter tab 802, a display similar to the one in FIG. 13A is displayed. By selecting the default values tab 804 in either FIG. 13A or 13B, a default values screen 850 is displayed as shown in FIG. 13B. The default values screen 850 allows a user to enable default values for certain fields in trades of a certain market type or counter party. The default values screen 850 has a filter bar 852 with a market type box 854 and a product box 856. By selecting a market type box 854 and a product box 856, a user may display all counter party information and default values in a summary table 860.

The summary table 860 includes a counter party column 862 and various other columns of field values 864 that represent different data values for the selected market type and product. The summary table 860 has other rows 866 each of which represents different counter parties that trade in the market type and product. The rows 866 each have a selection box 868. By checking the selection box 868, a user may select a clear button 870 to clear out all of the values for the selected row for the counter party. A user may also select a check all button 872 to check all of the rows 866. A user may clear all the checks by selecting a clear all button 874.

Figure 13C:
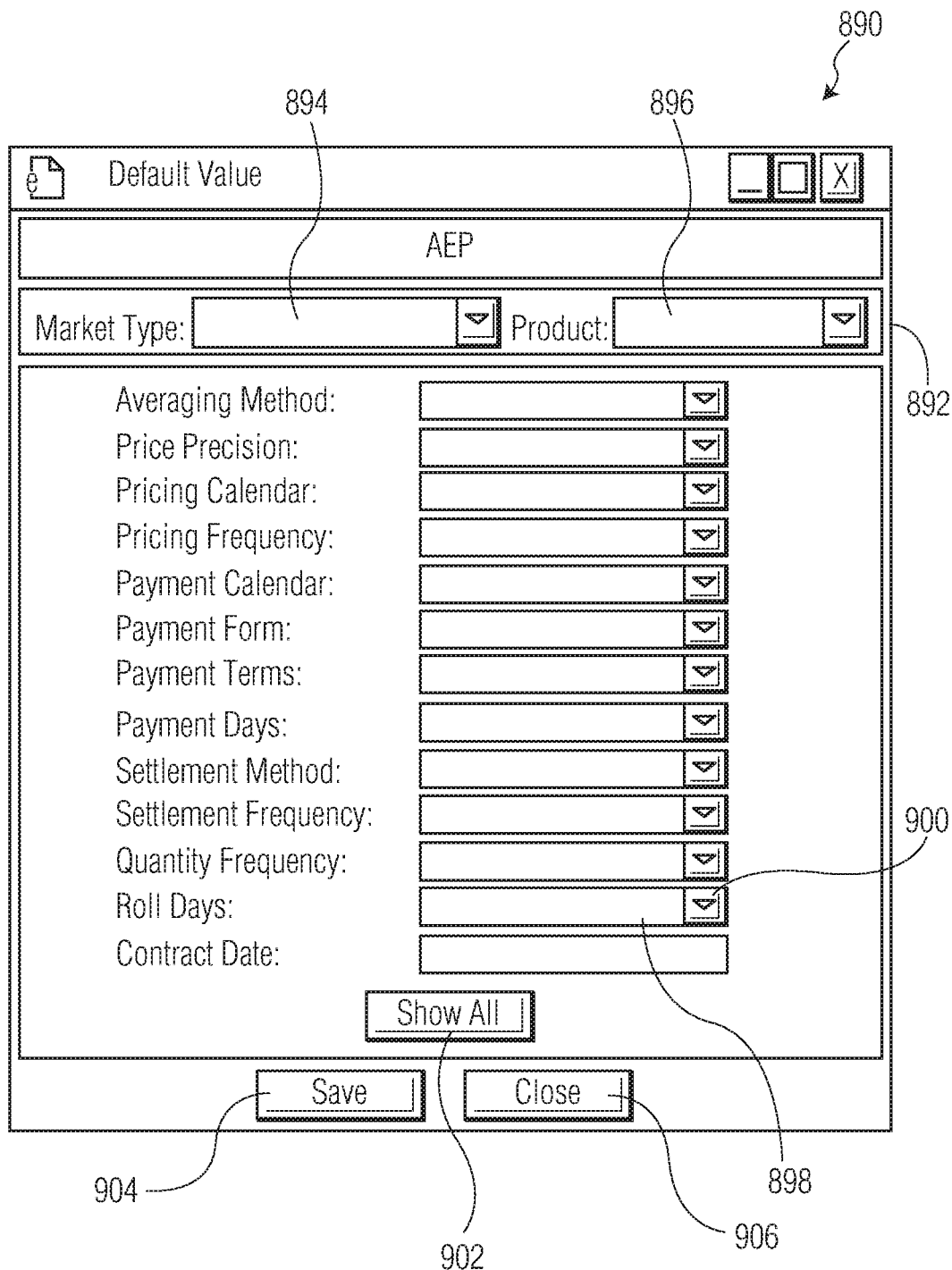
FIG. 13C is an administration screen for changing default values which is a user interface to the confirmation system of FIG. 1.

Certain fields in the summary table 860 such as a settlement frequency field 880 have "none" entered. In order to enter values, a user may select the field 880 which causes a pop up window 890 as shown in FIG. 13C to be displayed. The pop up window 890 has a filter bar 892 with a market type box 894 and a product box 896 which will initially have the selected market type and product from the default data screen 850 in FIG. 13B. The pop up window 890 will have selection boxes 898 that correspond to the fields that were selected from FIG. 13B. Each selection box 898 has a pull down list 900 which lists different default values. A user may select a default value or enter another value in the box 898. The default values will be initially selected to none until changed by the user.

A show all button 902 allows a user to display other fields that may have default values set up for the particular product and market. The entered default values may be saved via a save button 904 and the pop up window 890 may be closed via a close button 906.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. An electronic trade confirmation system comprising:
at least one computer comprising a processor;
a data interface, embodied on said at least one computer and configured to receive, via an Extensible Markup Language (XML) Application Programming Interface (API), first trade data from a first trading computer and second trade data from a second trading computer, wherein one or more of the first trade data and the second trade data comprise an XML message having a nonstandard format; and a non-transitory computer-readable storage medium having computer-readable program code stored therein operatively coupled to the processor, the processor executing the computer readable program code and causing said electronic trade confirmation system to:

convert one or more of the first trade data and the second trade data to a standard format, compare, following said convert, one or more XML tags of the first trade data and one or more XML tags of the second trade data, classify a trading transaction based on a comparison such that the first trading computer and the second trading computer may store, retrieve, search, edit, and track the trading transaction according to a classification, wherein if none of the one or more XML tags of the first trade data are inconsistent with the one or more XML tags of the second trade data, the trading transaction is classified as matched, and generate an electronic trade confirmation if the trading transaction is classified as matched.

2. The electronic trade confirmation system of claim 1, further comprising a central processor executing a matching program that further causes the electronic trade confirmation system to compare trade data, classify trading transactions, and confirm trading transactions.

3. The electronic trade confirmation system of claim 1, further comprising:
a database configured to store trade data, trade-confirmation data, and trade life cycle data.

4. The electronic trade confirmation system of claim 1, wherein the computer-readable code, when executed, further causes the electronic trade confirmation system to report matched trades, trade-confirmation data, and life cycle data, the life cycle data comprising information relating to each stage of a trade's life cycle.

5. The electronic trade confirmation system of claim 1, wherein one or more of the first trading computer and the second trading computer comprise trading terminals.

6. The electronic trade confirmation system of claim 2, wherein the matching program further enables the electronic trade confirmation system to classify trading transactions as at least one of a matched, alleged, unmatched, pending and canceled trade.

7. The electronic trade confirmation system of claim 6, wherein the matching program, when executed, enables a system administrator to manage and authorize users to access trade data and view summaries of executed trades, said summaries comprising trade life cycle data.

8. The electronic trade confirmation system of claim 7, wherein the matching program, when executed, enables the electronic trade confirmation system to identify inconsistencies between the trade data provided by the two or more trading participants, and to reconcile the inconsistencies according to additional trade data provided by at least one of the two or more trading participants.

9. The electronic trade confirmation system of claim 8, further comprising a back office systems terminal coupled to at least one trading terminal and to the processor, the back office systems terminal being operable for tracking trading transactions.

10. The electronic trade confirmation system of claim 1, wherein the data interface further comprises one or more of:
a tab delimited file interface for receiving trade data in a tab delimited format; and
a Simple Object Access Protocol (SOAP) data interface protocol for inputting trade data to the processing system.

11. The electronic trade confirmation system of claim 1, wherein the data interface is further configured for providing an XML response mechanism for requests received via the XML API interface.

12. The electronic trade confirmation system of claim 1, wherein the data interface further comprises an e-mail notification interface for providing responses to requests based on predefined specific events.

13. The electronic trade confirmation system of claim 1, further comprising:
a web server cluster;
a weblogic application server cluster;
a trade mapping engine; and
an e-mail server.

14. The electronic trade confirmation system of claim 1, wherein the computer-readable code comprises a rules-based architecture for matching predefined data fields in data files in the first trade data and the second trade data, said rules-based architecture comprising tables for segregating trade data and XML tags for defining trade product characteristics, the trade product characteristics being used as matching criteria.

15. The electronic trade confirmation system of claim 1, wherein a user of one or more of the first trading computer and the second trading computer comprises one or more of a trader, a trading firm, a broker, a brokerage firm, a company, a company subsidiary, and an energy company.

16. The electronic trade confirmation system of claim 1, wherein a user of one or more of the first trading computer and the second trading computer comprises a combination of brokers and brokerage firms.

17. The electronic trade confirmation system of claim 1, wherein the computer-readable code, when executed, further causes the electronic trade confirmation system to provide a broker matching service for confirming, consummating, and reporting electronic over-the-counter trading transactions to broker-type trading participants.

18. The electronic trade confirmation system of claim 3, wherein the database is accessible by one or more of the first trading computer and the second trading computer for storing, retrieving, searching, editing, saving, and tracking the trading transaction according to the classification.

* * * * *